United States Patent
Tezgel et al.

(10) Patent No.: US 12,544,455 B2
(45) Date of Patent: Feb. 10, 2026

(54) TARGETED POLY(BETA-AMINO ESTER)S

(71) Applicant: Ixaka France, Villejuif (FR)

(72) Inventors: Özgül Tezgel, Paris (FR); Frédéric Mourlane, Nice (FR); Renaud Vaillant, Gentilly (FR); Cécile Bauche, Paris (FR)

(*) Notice: Subject to any disclaimer, the term of this patent is extended or adjusted under 35 U.S.C. 154(b) by 0 days.

(21) Appl. No.: 17/914,952

(22) PCT Filed: Mar. 29, 2021

(86) PCT No.: PCT/IB2021/000181
§ 371 (c)(1),
(2) Date: Sep. 27, 2022

(87) PCT Pub. No.: WO2021/191686
PCT Pub. Date: Sep. 30, 2021

(65) Prior Publication Data
US 2025/0345456 A1 Nov. 13, 2025

Related U.S. Application Data

(60) Provisional application No. 63/001,209, filed on Mar. 27, 2020.

(51) Int. Cl.
*A61K 47/69* (2017.01)
*A61K 47/54* (2017.01)
*A61K 47/59* (2017.01)
*A61K 47/62* (2017.01)
*C08G 63/91* (2006.01)

(52) U.S. Cl.
CPC ........ *A61K 47/6935* (2017.08); *A61K 47/545* (2017.08); *A61K 47/549* (2017.08); *C08G 63/916* (2013.01)

(58) Field of Classification Search
CPC .............. A61K 47/6935; A61K 47/545; A61K 47/549; C08G 63/916
See application file for complete search history.

(56) References Cited

U.S. PATENT DOCUMENTS

2013/0259879 A1* 10/2013 Baumhof ............. A61K 47/549
424/193.1
2015/0005481 A1 1/2015 Chin et al.

OTHER PUBLICATIONS

B. L. Oliveira, Z. Guo, and G. J. L. Bernardes "Inverse electron demand Diels-Alder reactions in chemical biology," Chem. Soc. Rev. 2017, 46, 4895. (Year: 2017).*
Jones et al., "Mannosylated poly(beta-amino esters) for targeted antigen presenting cell immune modulation", Biomaterials Jan. 2015; 37: 23 pages.
Dosta et al., "Surface charge tunability as a powerful strategy to control electrostatic interaction for high efficiency silencing, using tailored oligopeptide-modified poly(beta-amino ester)s (PBAEs)", Acta Biomater. 2015 vol. 20:pp. 82-93.
Fornaguera et al., "In Vivo Retargeting of Poly(beta aminoester) (OM-PBAE) Nanoparticles is Influenced by Protein Corona", Adv Healthc Mater. 2019, 11 pages.
Schoch et al., "Inverse Electron-Demand Diels-Alder Reactions for the Selective and Efficient Labeling of RNA", Chem. Commun. 2011, 47, 12536-12537.
Zhang et al., "Nucleolin targeting AS1411 aptamer modified pH-sensitive micelles for enhanced delivery and antitumor efficacy of paclitaxel", Nano Research 2015, 8(1): 201-218.

* cited by examiner

*Primary Examiner* — Michael P Cohen
(74) *Attorney, Agent, or Firm* — Verrill Dana, LLP

(57) ABSTRACT

Nontoxic, targeted poly beta-amino esters (PBAEs) are synthesized by using click chemistry to attach a targeting moiety. The click chemistry uses a dienophile, such as a strained alkene ring, and a diene, such as tetrazine, to provide rapid attachment of targeting moieties to PBAE polymers and nanoparticle surfaces containing them. Targeting moieties such as aptamers, antibodies or antibody-like proteins can be quickly and safely coupled to PBAEs to provide highly specific localization of nanoparticles for gene therapy or targeted delivery of therapeutics.

32 Claims, 14 Drawing Sheets
Specification includes a Sequence Listing.

```
                           SEQUENCE LISTING

<160> NUMBER OF SEQ ID NOS: 56

<210> SEQ ID NO 1
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 1

Cys His His His
1

<210> SEQ ID NO 2
<211> LENGTH: 5
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 2

Cys His His His His
1               5

<210> SEQ ID NO 3
<211> LENGTH: 6
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 3

Cys His His His His His
1               5

<210> SEQ ID NO 4
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 4

Cys Arg Arg Arg
1

<210> SEQ ID NO 5
<211> LENGTH: 5
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 5

Cys Arg Arg Arg Arg
1               5
```

```
<210> SEQ ID NO 6
<211> LENGTH: 6
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 6

Cys Arg Arg Arg Arg Arg
1               5

<210> SEQ ID NO 7
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 7

Cys Lys Lys Lys
1

<210> SEQ ID NO 8
<211> LENGTH: 5
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 8

Cys Lys Lys Lys Lys
1               5

<210> SEQ ID NO 9
<211> LENGTH: 6
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 9

Cys Lys Lys Lys Lys Lys
1               5

<210> SEQ ID NO 10
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 10

Cys Glu Glu Glu
1

<210> SEQ ID NO 11
<211> LENGTH: 5
<212> TYPE: PRT
<213> ORGANISM: Artificial Sequence
<220> FEATURE:
<223> OTHER INFORMATION: oligopeptide for Modified Poly (beta-amino
      ester)s
```

```
<400> SEQUENCE: 11

Cys Glu Glu Glu Glu
1               5

<210> SEQ ID NO 12
<211> LENGTH: 6
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 12

Cys Glu Glu Glu Glu Glu
1               5

<210> SEQ ID NO 13
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 13

Cys Asp Asp Asp
1

<210> SEQ ID NO 14
<211> LENGTH: 5
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 14

Cys Asp Asp Asp Asp
1               5

<210> SEQ ID NO 15
<211> LENGTH: 6
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 15

Cys Asp Asp Asp Asp Asp
1               5

<210> SEQ ID NO 16
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 16

Cys His Arg His
1

<210> SEQ ID NO 17
<211> LENGTH: 4
```

```
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 17

Cys His Arg Arg
1

<210> SEQ ID NO 18
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 18

Cys His Lys His
1

<210> SEQ ID NO 19
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 19

Cys His Lys Lys
1

<210> SEQ ID NO 20
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 20

Cys His Glu His
1

<210> SEQ ID NO 21
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 21

Cys His Glu Glu
1

<210> SEQ ID NO 22
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 22

Cys His Asp His
```

<210> SEQ ID NO 23
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 23

Cys His Asp Asp
1

<210> SEQ ID NO 24
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 24

Cys Arg His Arg
1

<210> SEQ ID NO 25
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 25

Cys Arg His His
1

<210> SEQ ID NO 26
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 26

Cys Arg Lys Arg
1

<210> SEQ ID NO 27
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 27

Cys Arg Lys Lys
1

<210> SEQ ID NO 28
<211> LENGTH: 4
<212> TYPE: PRT
<213> ORGANISM: Artificial Sequence
<220> FEATURE:
<223> OTHER INFORMATION: oligopeptide for Modified Poly (beta-amino ester)s

<400> SEQUENCE: 28

Cys Arg Glu Arg
1

<210> SEQ ID NO 29
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 29

Cys Arg Glu Glu
1

<210> SEQ ID NO 30
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 30

Cys Arg Asp Arg
1

<210> SEQ ID NO 31
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 31

Cys Arg Asp Asp
1

<210> SEQ ID NO 32
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 32

Cys Lys His Lys
1

<210> SEQ ID NO 33
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 33

Cys Lys His His
1

<210> SEQ ID NO 34

```
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 34

Cys Lys Arg Lys
1

<210> SEQ ID NO 35
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 35

Cys Lys Arg Arg
1

<210> SEQ ID NO 36
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 36

Cys Asp His Asp
1

<210> SEQ ID NO 37
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 37

Cys Asp His His
1

<210> SEQ ID NO 38
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 38

Cys Asp Arg Asp
1

<210> SEQ ID NO 39
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 39
```

Cys Asp Arg Arg
1

<210> SEQ ID NO 40
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 40

Cys Asp Lys Asp
1

<210> SEQ ID NO 41
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 41

Cys Asp Lys Lys
1

<210> SEQ ID NO 42
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 42

Cys Glu His Glu
1

<210> SEQ ID NO 43
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 43

Cys Glu His His
1

<210> SEQ ID NO 44
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 44

Cys Glu Arg Glu
1

<210> SEQ ID NO 45
<211> LENGTH: 4
<212> TYPE: PRT
<213> ORGANISM: Artificial Sequence
<220> FEATURE:

```
<223> OTHER INFORMATION: oligopeptide for Modified Poly (beta-amino
      ester)s

<400> SEQUENCE: 45

Cys Glu Arg Arg
1

<210> SEQ ID NO 46
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 46

Cys Glu Asp Glu
1

<210> SEQ ID NO 47
<211> LENGTH: 4
<212> TYPE: PRT
<213> ORGANISM: Artificial Sequence
<220> FEATURE:
<223> OTHER INFORMATION: oligopeptide for Modified Poly (beta-amino
      ester)s

<400> SEQUENCE: 47

Cys Glu Asp Asp
1

<210> SEQ ID NO 48
<211> LENGTH: 12
<212> TYPE: PRT
<213> ORGANISM: Human immunodeficiency virus

<400> SEQUENCE: 48

Gly Arg Lys Lys Arg Arg Gln Arg Arg Arg Pro Gln
1               5                   10

<210> SEQ ID NO 49
<211> LENGTH: 18
<212> TYPE: PRT
<213> ORGANISM: Drosophila melanogaster

<400> SEQUENCE: 49

Arg Gln Ile Lys Ile Trp Phe Gln Asn Arg Arg Met Lys Trp Lys Lys
1               5                   10                  15

Gly Gly

<210> SEQ ID NO 50
<211> LENGTH: 13
<212> TYPE: PRT
<213> ORGANISM: Simian virus 40

<400> SEQUENCE: 50

Cys Gly Tyr Gly Pro Lys Lys Lys Arg Lys Val Gly Gly
1               5                   10

<210> SEQ ID NO 51
<211> LENGTH: 21
<212> TYPE: PRT
<213> ORGANISM: Drosophila melanogaster

<400> SEQUENCE: 51
```

Ala Gly Tyr Leu Leu Gly Lys Ile Asn Leu Lys Ala Leu Ala Ala Leu
1               5                   10                  15

Ala Lys Lys Ile Leu
            20

<210> SEQ ID NO 52
<211> LENGTH: 21
<212> TYPE: PRT
<213> ORGANISM: Simian virus 40

<400> SEQUENCE: 52

Lys Glu Thr Trp Trp Glu Thr Trp Trp Thr Glu Trp Ser Gln Pro Lys
1               5                   10                  15

Lys Lys Arg Arg Val
            20

<210> SEQ ID NO 53
<211> LENGTH: 18
<212> TYPE: PRT
<213> ORGANISM: Artificial Sequence
<220> FEATURE:
<223> OTHER INFORMATION: Model amphipathic peptide (MAP)

<400> SEQUENCE: 53

Lys Leu Ala Leu Lys Leu Ala Leu Lys Ala Leu Lys Ala Ala Leu Lys
1               5                   10                  15

Leu Ala

<210> SEQ ID NO 54
<211> LENGTH: 15
<212> TYPE: PRT
<213> ORGANISM: flock house virus

<400> SEQUENCE: 54

Arg Arg Arg Arg Asn Arg Thr Arg Arg Asn Arg Arg Arg Val Arg
1               5                   10                  15

<210> SEQ ID NO 55
<211> LENGTH: 18
<212> TYPE: PRT
<213> ORGANISM: Mus musculus

<400> SEQUENCE: 55

Leu Leu Ile Ile Leu Arg Arg Arg Ile Arg Lys Gln Ala His Ala His
1               5                   10                  15

Ser Lys

<210> SEQ ID NO 56
<211> LENGTH: 21
<212> TYPE: DNA
<213> ORGANISM: Artificial Sequence
<220> FEATURE:
<223> OTHER INFORMATION: DNA aptamer CD3_CELTIC_core40HEGt

<400> SEQUENCE: 56
gggtttggca tcgggtctgg c                                        21

TARGETED POLY(BETA-AMINO ESTER)S

CROSS-REFERENCE TO RELATED APPLICATIONS

This application claims priority to U.S. Provisional Application No. 63/001,209, filed 27 Mar. 2020, which is incorporated by reference herein in its entirety.

BACKGROUND

Gene therapy offers a novel therapeutic approach for the treatment of a wide range of hereditary or non-hereditary conditions. Several viral and non-viral vectors have been explored in the area of gene therapy. One of the biggest challenges for gene delivery systems is achieving target specificity. Most of the nanoparticle-based gene delivery systems developed up to now have used a passive targeting approach which is often not enough to increase the efficiency of such systems. More recently, grafting cell or tissue specific targeting moieties on the nanoparticle surface has been employed for the development of cell/tissue specific gene/drug delivery systems.

Several polymer systems have already been applied in the field of gene therapy, including cationic synthetic polymers, polysaccharides and polypeptides (Lv, H et al. 2006). Poly(beta-amino ester)s (PBAEs) have been recognized as promising candidates in polymer-based gene delivery systems in the last decades, thanks to their biodegradable and pH-sensitive features. More than 2000 PBAEs have been synthesized using different diacrylate and amine monomers. Furthermore, cell specific targeting ligands have been used to increase the efficiency of PBAE nanoparticle delivery systems. Cell targeting moieties have been conjugated through end group functionalization to PBAEs. For example, mannose has been used to target antigen presenting cells (Jones, C H et al. 2015). Additionally, two other approaches which have been applied to modify PBAE backbone with targeting moieties are use of a copolymerization technique (Fornaguera C et al. 2019) and a classical N,N'-dicyclohexylcarbodiimide (DCC) coupling reaction (Zhang J et al. 2015). Alternatively, targeting ligands (RGD peptide, mannose or antibody) have been introduced into PBAE nanoparticles via a layer-by-layer coating strategy using a ligand-conjugated polyglutamic acid (Green J J et al. 2007, Zhang F et al. 2019, Smith T T et al. 2017).

In the last decade, click chemistry has attracted significant attention in the field of drug delivery to introduce targeting ligands orthogonally on a nanoparticle surface. The concept of click chemistry was first introduced by Sharpless in the early 2000s. The term "click chemistry" was used to define the reactions which are modular, stereospecific and have fast kinetics with high yields and negligible and/or harmless by-products which can easily be removed without labor-intensive techniques. In addition, reaction conditions can be simple, using easily available reagents, and final products can be easily isolated (Kolb H C et al. 2001). Click chemistry techniques include: copper (Cu)-catalyzed azide-alkyne cycloaddition (Cu-AAC), strain-promoted azide-alkyne cycloaddition (SPAAC), and inverse electron demand Diels-Alder (IEDDA) cycloaddition, which is a cycloaddition reaction between an electron-rich dienophile (such as a norbornene, cyclopropene, or cyclooctene compound), and an electron-poor diene (such as tetrazine). Norbornene-tetrazine based IEDDA click chemistry has been applied in peptide (US20150005481A1), antibody (Meyer C et al. 2016) and nucleic acid (Schoch J et al 2011) labeling applications.

SUMMARY

The present technology provides IEDDA click chemistry to quickly bond almost any targeting moiety to a PBAE or other polymer backbone for targeted gene therapy. A strategy enabling click chemistry in a biocompatible solution, without requiring extensive purification afterwards, is provided to advance rapid attachment of aptamers, antibodies, or antibody-like proteins to oligopeptide-modified PBAEs (OM-PBAEs). As the elucidation of aptamers rapidly advances, the technology can provide payload delivery for a variety of gene (or other) therapeutics utilizing aptamers to guide the delivery.

The present technology can be further summarized in the following list of features.

1. A method of synthesizing a targeted poly(beta-amino ester) (PBAE) compound, the method comprising coupling a tetrazine functionalized targeting moiety to a strained alkene ring functionalized PBAE using IEDDA click chemistry.

2. The method of feature 1, wherein the strained alkene ring is selected from the group consisting of norbornene, a carbon containing ring including a strained alkene, a carbon containing ring including a bridged bond and a strained alkene, cyclopropene, cyclobutene, and trans-cyclooctene.

3. The method of feature 2, wherein the strained alkene ring is norbornene.

4. The method of any of the preceding features, wherein the tetrazine functionalized targeting moiety comprises 1,2,3,5-tetrazine.

5. The method of feature 4, wherein the tetrazine functionalized targeting moiety comprises a structure according to Formula 10

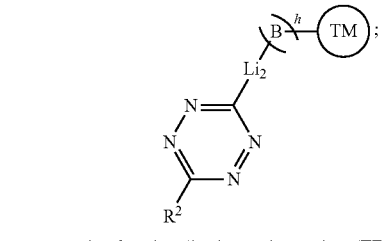

(Formula 10)

tetrazine functionalized targeting moiety (TFM)

wherein Li2 is a bond, —(CH$_2$)—, —O—, —O—(C=O)—, —(C=O)—O—,

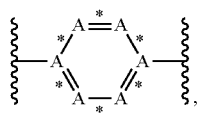

or a combination thereof; wherein each atom at A is independently selected from C, N, O, S, and B and each bond at * is independently a single bond, a resonant and/or semi-resonant aromatic bond, or a double bond; wherein B is a bond, —(CH$_2$)—, —O—, —O—(C=O)—, —(C=O)—O—, —S—, —S—(C=O)—, —SO2CH$_3$—, —(C=O)—S—, —N—, —N—(C=O)—, —(C=O)—N—, or a combination thereof;

wherein R$^3$ is hydrogen or a substituent;

wherein h is not less than 3; and wherein TM is a targeting moiety.

6. The method of feature 5, wherein R$^3$ is a bond, —H, —(CH$_2$)—, —O—, —OCH$_3$, —O—(C=O)—, —(C=O)—O—, —S—, —S—(C=O)—, —(C=O)—S—, —N—, —N—(C=O)—, —(C=O)—N—, —(C=O)—O—CH$_3$, CH$_3$—(C=O)—O—, —SO2CH$_3$—, —SCH$_3$—, —(C=O)—CH$_3$(Acetyl, Ac), —(C=O)—O-tert-butyl (BOC), —NHAc, —NHBOC,

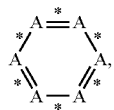

or a combination thereof; and wherein each atom at A is independently selected from C, N, O, S, and B, and each bond at * is independently a single bond, a resonant aromatic bond, or a double bond.

7. The method of feature 5 or feature 6, wherein Li2 comprises

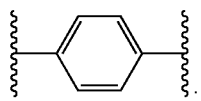 [SMILES: *c1ccc(*)cc1]

8. The method of any of features 5-7, wherein the tetrazine functionalized targeting moiety comprises a structure according to Formula 11

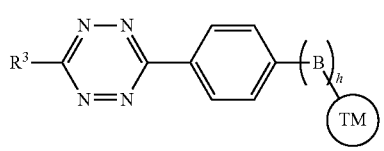

9. The method any of the preceding features, wherein the targeting moiety comprises an aptamer, a multispecific aptamer, an antibody, an antibody fragment, a scFv antibody, an antibody-like protein scaffold, an oligopeptide, a spiegelmer, a ligand for a cell surface receptor, or a combination thereof.

10. The method of any of the preceding features, wherein the coupling is performed in an aqueous solution, optionally at a temperature in the range from about 15° C. to about 30° C.

11. The method of any of the preceding features, wherein greater than about 70%, 80%, 90%, 95%, or 99% (mol %) of the tetrazine functionalized targeting moiety is coupled to the strained alkene ring functionalized PBAE in less than about 15 minutes.

12. The method of any of the preceding features, further comprising synthesizing the functionalized PBAE by a method comprising the steps of:

polymerizing amine and diacrylate monomers to yield a PBAE-diacrylate precursor; and grafting a strained alkene ring comprising norbornene carboxylic acid onto an —OH side chain of the PBAE-diacrylate backbone via DCC coupling to obtain a norbornene-functionalized PBAE.

13. The method of any of the preceding features, further comprising:

modifying the norbornene functionalized PBAE using a cysteine-containing oligopeptide using a thiol-Michael addition reaction.

14. The method of feature 13, wherein the oligopeptide is selected from the group consisting of Cys-Arg-Arg-Arg (SEQ ID NO:4), Cys-Lys-Lys-Lys (SEQ ID NO:7), Cys-His-His-His (SEQ ID NO:1), Cys-Glu-Glu-Glu (SEQ ID NO:10), and Cys-Asp-Asp-Asp (SEQ ID NO:13).

15. The method of any of the preceding features, wherein the click chemistry reaction is performed by reacting said tetrazine functionalized targeting moiety with a nanoparticle comprising a norbornene functionalized PBAE on a surface of the nanoparticle.

16. A targeted PBAE obtainable by the method of any of the preceding features.

17. A targeted nanoparticle comprising the targeted PBAE of feature 16.

18. The targeted nanoparticle of feature 17, wherein the targeting moiety of the targeted PBAE is an aptamer, an antibody, an antibody fragment, a scFv, an antibody-like protein scaffold, an oligopeptide, a spiegelmer, or a ligand for a cell surface receptor that binds an antigen specific for a tumor cell or an immune cell.

19. The targeted nanoparticle of feature 18, wherein the aptamer is an anti-CD3 aptamer.

20. A kit for synthesizing a targeted poly(beta-amino ester) (PBAE) compound, the kit comprising:

a norbornene functionalized PBAE; and instructions for carrying out the method of any of features 1-15.

21. The kit of feature 20, further comprising:

a tetrazine functionalized targeting moiety.

22. The kit of feature 20 or 21, wherein the norbornene functionalized PBAE is present in a nanoparticle.

23. A targeted poly(beta-amino ester) (PBAE) comprising:

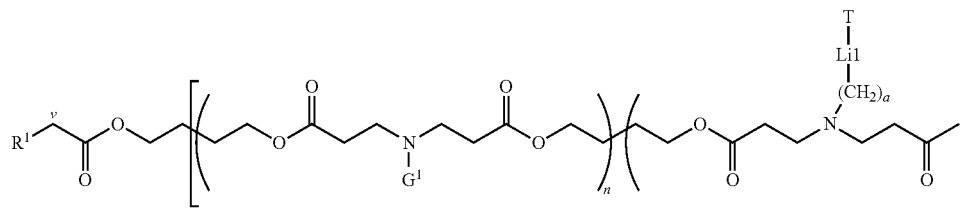

(Formula 9)

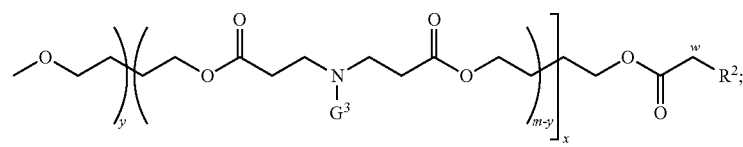

wherein $G^1$ and $G^3$ are independently selected at each occurrence from the group consisting of —H, $H_3C$—$(CH_2)_{(2-9)}$—, and HO—$(CH_2)_{(3-10)}$—;

$R^1$ and $R^2$ are independently selected from the group consisting of $CH_2$ with C=C double bond to atom v or to atom w;

(Formula 5)

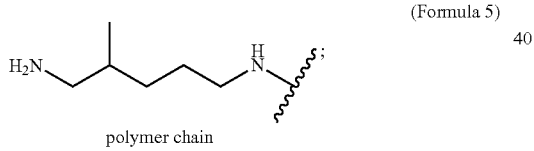

polymer chain (Formula 6)

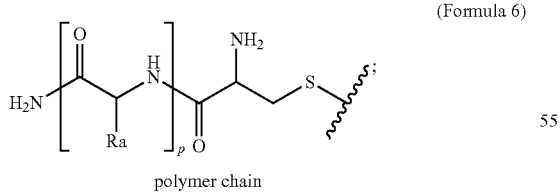

polymer chain

SEQ ID NO:4; SEQ ID NO:7; SEQ ID NO:1; SEQ ID NO:10; and SEQ ID NO:13;

Ra is independently selected at each occurrence from the group consisting of $H_2NC(=NH)$—$NH(CH_2)_3$—, $H_2N(CH_2)_4$—, $COO(CH_2)_{(1)}$—, $COO(CH_2)_{(2)}$—, and (1H-imidazol-4-yl)-$CH_2$—; Li1 is independently selected at each occurrence from the group consisting of a bond, —O—, —O—(C=O)—, —(C=O)—O—, and —$(CH_2)$—;

a is an integer in the range from 3-10; p is an integer in the range from 1-3; n is an integer in the range from 1-500; y is an integer in the range from 1-500; m is an integer in the range from 1-500; x is an integer in the range from 5-10000; and in one or more occurrence, each of the one or more T independently comprises a strained alkene ring (SAR):

24. The PBAE of feature 23, wherein the strained alkene ring (SAR) comprises norbornene, a carbon containing ring including a strained alkene, a carbon containing ring including a bridged bond and a strained alkene, cyclopropene, cyclobutene, or trans-cyclooctene.

25. The PBAE of features 23 or 24, wherein $R^1$ and/or $R^2$ are attached to the polymer chain through a covalent bond comprising a thioether —S—.

26. The targeted PBAE of any of features 23-25, further comprising a tetrazine functionalized targeting moiety (TFM) including a targeting moiety (TM).

27. The PBAE of feature 26, wherein the tetrazine functionalized targeting moiety (TFM) comprises:

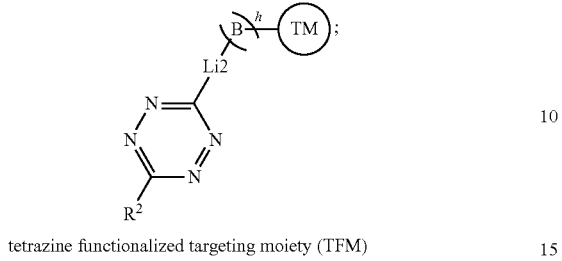

(Formula 10)

tetrazine functionalized targeting moiety (TFM)

wherein Li2 comprises a bond, —(CH$_2$)—, —O—, —O—(C=O)—, —(C=O)—O—,

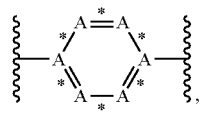

or a combination thereof; wherein each atom at A is independently selected from C, N, O, S, and B and each bond at * is independently a single bond, a resonant and/or semi-resonant aromatic bond, or a double bond;

B comprises a bond, —(CH$_2$)—, —O—, —O—(C=O)—, —(C=O)—O—, —S—, —S—(C=O)—, —SO2CH$_3$—, —(C=O)—S—, —N—, —N—(C=O)—, —(C=O)—N—, or a combination thereof;

R$^3$ is hydrogen or a substituent;

h is not less than 3; and

TM is a targeting moiety.

28. The PBAE of feature 27, wherein R$^3$ comprises a bond, —H, —(CH$_2$)—, —O—, —OCH$_3$, —O—(C=O)—, —(C=O)—O—, —S—, —S—(C=O)—, —(C=O)—S—, —N—, —N—(C=O)—, —(C=O)—N—, —(C=O)—O—CH$_3$, CH$_3$—(C=O)—O—, —SO2CH$_3$—, —SCH$_3$—, —(C=O)—CH$_3$(Acetyl, Ac), —(C=O)—O-tert-butyl (BOC), —NHAc, —NHBOC,

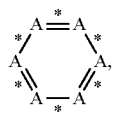

or a combination thereof; and with each atom at A independently selected from C, N, O, S, and B and each bond at * is independently a single bond, a resonant aromatic bond, or a double bond.

29. The PBAE of feature 27, wherein Li2 comprises

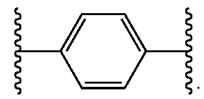

30. The PBAE of feature 29, wherein the tetrazine functionalized targeting (TFM) moiety comprises:

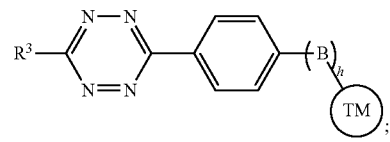

(Formula 11)

wherein R$^3$ is H or a substituent; B comprises a bond, —(CH$_2$)—, —O—, —O—(C=O)—, —(C=O)—O—, —S—, —S—(C=O)—, —SO2CH$_3$—, —(C=O)—S—, —N—, —N—(C=O)—, —(C=O)—N—, or a combination thereof; h is not less than 3; and TM is a targeting moiety.

31. The PBAE of feature 30, wherein R$^3$ comprises a bond, —H, —(CH$_2$)—, —O—, —OCH$_3$, —O—(C=O)—, —(C=O)—O—, —S—, —S—(C=O)—, —(C=O)—S—, —N—, —N—(C=O)—, —(C=O)—N—, —(C=O)—O—CH$_3$, CH$_3$—(C=O)—O—, —SO2CH$_3$—, —SCH$_3$—, —(C=O)—CH$_3$(Acetyl, Ac), —(C=O)—O-tert-butyl (BOC), —NHAc, —NHBOC,

or a combination thereof; and with each atom at A independently selected from C, N, O, S, and B and each bond at * is independently a single bond, a resonant aromatic bond, or a double bond.

32. A targeted PBAE comprising:

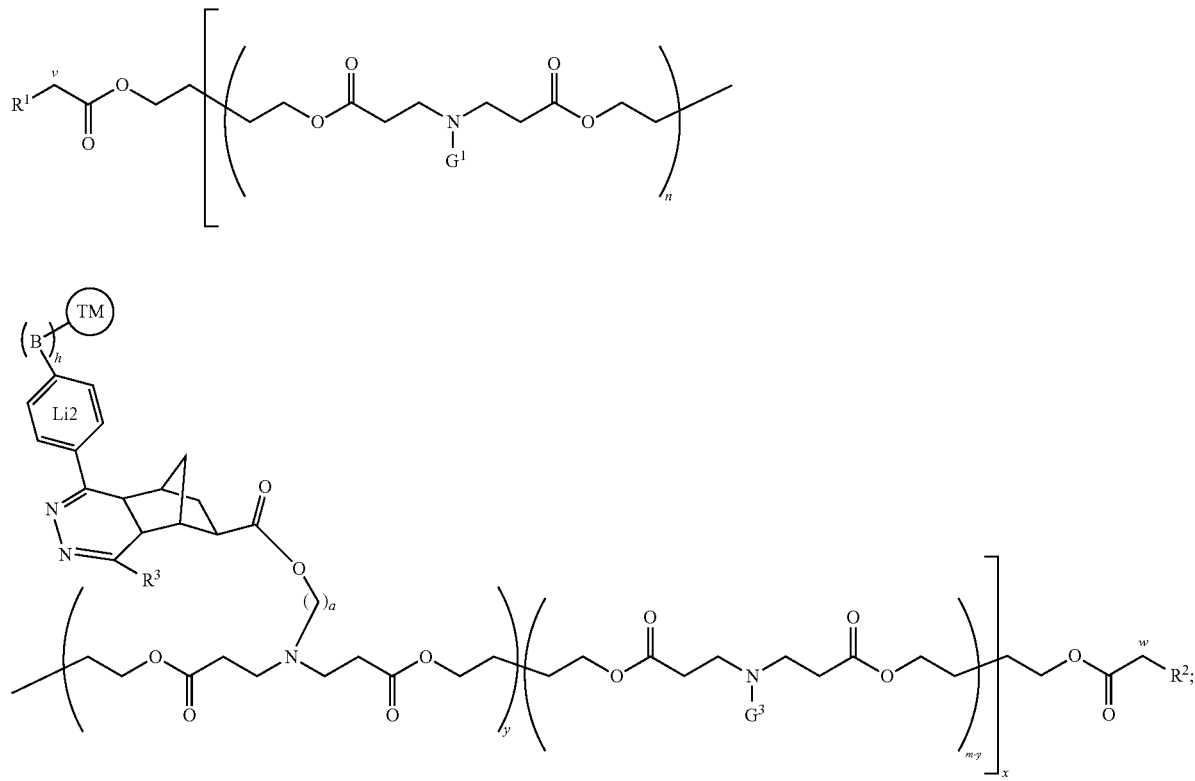

(Formula 12)

wherein $G^1$ and $G^3$ are independently selected at each occurrence from the group consisting of —H, H$_3$C—(CH$_2$)$_{(2-9)}$—, and HO—(CH$_2$)$_{(3-10)}$—;

$R^1$ and $R^2$ are independently selected from the group consisting of CH$_2$ with C=C double bond to atom v or to atom w;

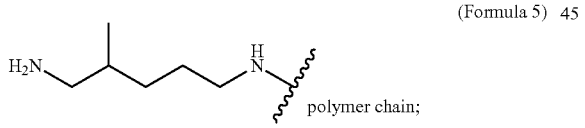

(Formula 5)

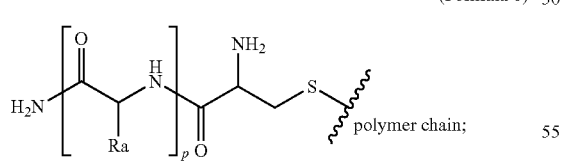

(Formula 6)

SEQ ID NO:4; SEQ ID NO:7; SEQ ID NO:1; SEQ ID NO:10; and SEQ ID NO:13;

Ra is independently selected at each occurrence from the group consisting of H$_2$NC(=NH)—NH(CH$_2$)$_3$—, H$_2$N(CH$_2$)$_4$—, COO(CH$_2$)$_{(1)}$—, COO(CH$_2$)$_{(2)}$—, and (1H-imidazol-4-yl)-CH$_2$—; Li1 is independently selected at each occurrence from the group consisting of a bond, —O—, —O—(C=O)—, —(C=O)—C—, and —(CH$_2$)—;

a is an integer in the range from 3-10; p is an integer in the range from 1-3; n is an integer in the range from 1-500; y is an integer in the range from 1-500; m is an integer in the range from 1-500; x is an integer in the range from 5-10000; and TM is a targeting moiety comprising an aptamer, a multispecific aptamer, an antibody, an antibody fragment, a scFv, an antibody-like protein scaffold, an oligopeptide, a spiegelmer, a ligand for cell surface receptors, SEQ ID NO 6, or a combination thereof.

BRIEF DESCRIPTION OF DRAWINGS

FIG. 8A shows expression levels of CD25 and CD69 surface markers on CD8-positive T lymphocytes. FIG. 8B shows expression levels of CD25 and CD69 surface markers on CD4-positive T lymphocytes. Each condition represents mean values obtained on PBMCs from two different blood donors. For comparison, activation of PBMCs cultured alone or in presence of anti-CD3 (CD3 mAb) and anti-CD28 monoclonal antibodies (at concentrations of 7 nM each) are shown.

FIG. 10A shows expression levels of CD3 surface marker on T lymphocytes. FIG. 10B shows expression levels of CD4 and CD8 surface markers on T lymphocytes. Each condition represents mean values obtained on PBMCs from two different blood donors. For comparison, expression of these receptors on the surface of PBMCs cultured alone or in presence of anti-CD3 (CD3 mAb) and anti-CD28 monoclonal antibodies (at concentrations of 7 nM each) are shown.

DETAILED DESCRIPTION

The present technology utilizes IEDDA click chemistry to introduce functional groups on a PBAE backbone. Strained alkenes, such as norbornenes, react very rapidly and selectively with tetrazine functionalities to form stable adducts with rate constants much faster than well-established click chemistry protocols. Moreover, conjugation of targeting ligands in a site specific, orthogonal manner through IEDDA click chemistry can be performed via reaction between norbornene and tetrazine functional groups in aqueous solutions at room temperature, such as in the range from about 15° C. to about 30° C. The final adducts of IEDDA click chemistry can be used as it is, without further treatment or purification, since no additional reagents are used during the reaction.

Figure 2:
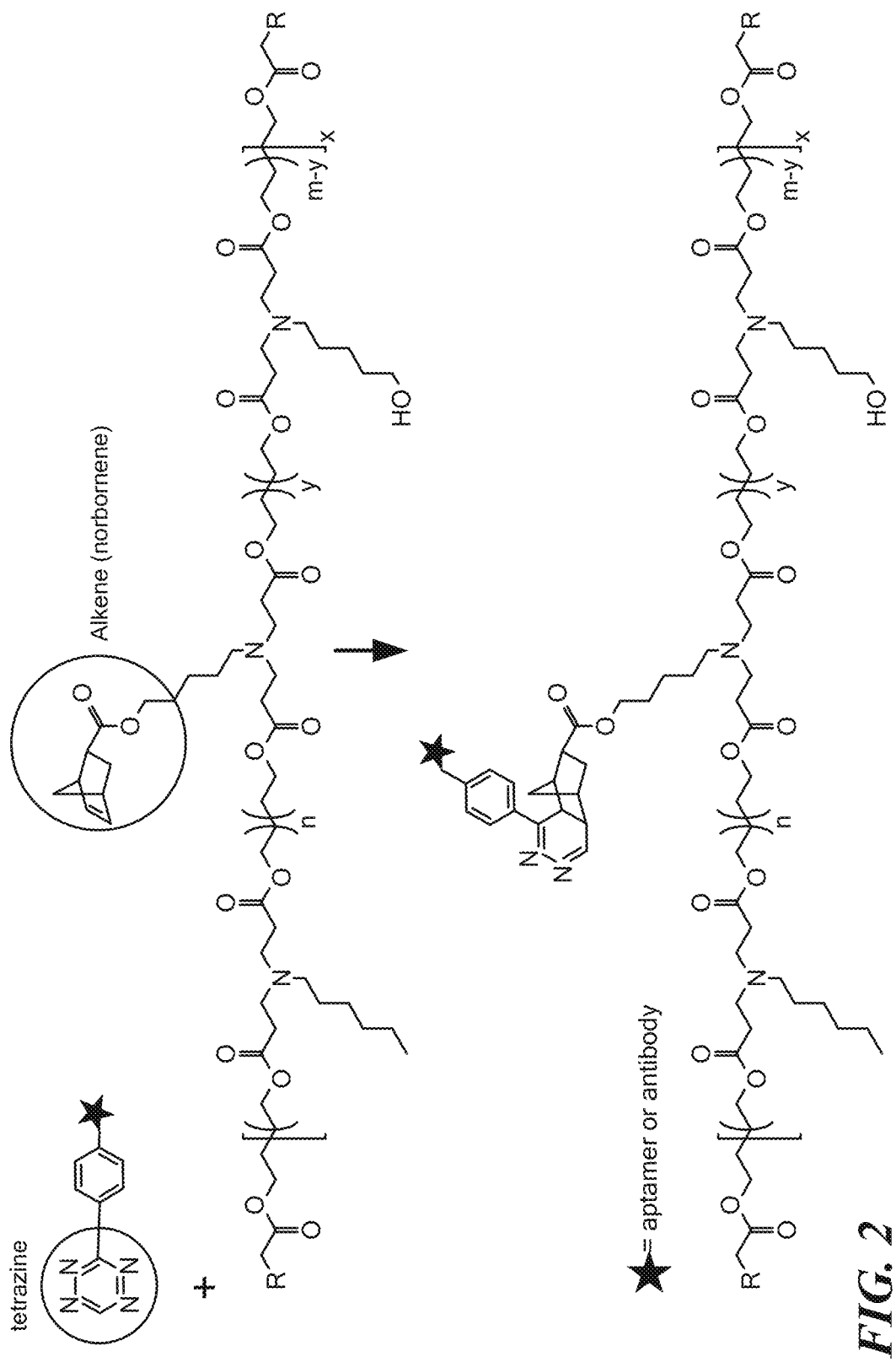
FIG. 2 shows the scheme of an IEDDA click chemistry reaction between a Nb-functionalized, oligopeptide-modified PBAE (OM-PBAE) and a tetrazine (Tz) functionalized targeting ligand (for example, an aptamer or antibody, represented by a star). "R" on the polymer chain ends represents tetrapeptide structures (for example, cys-arg-arg-arg (CRRR, SEQ ID NO: 4), cys-lys-lys-lys (CKKK, SEQ ID NO: 7), cys-his-his-his (CHHH, SEQ ID NO: 1), cys-glu-glu-glu (CEEE, SEQ ID NO: 10), or cys-asp-asp-asp (CDDD, SEQ ID NO; 13) which were added via a post-polymerization reaction to the Nb-modified PBAE-diacrylate polymer.

Targeting ligand conjugated OM-PBAE polymers can be synthesized using a four-step synthesis procedure. The first step includes the polymerization of amine and diacrylate monomers to yield PBAE-diacrylate precursors. The second step involves grafting of norbornene carboxylic acid on one of the —OH side chains on a PBAE-diacrylate backbone via DCC coupling. The third step is the polymer-end group modification using cysteine-containing tetrapeptides through a thiol-Michael addition reaction. The last step includes the grafting of one or more tetrazine functionalized targeting ligands (e.g., aptamer, multispecific aptamer, or antibody, antibody fragment, scFv, antibody-like protein scaffold, oligopepetide, spiegelmer) onto the norbornene modified OM-PBAE via IEDDA click chemistry (FIG. 2). Alternatively, in a three-step synthesis, the first step can be omitted, and the PBAE-diacrylate is provided as the starting material. In another alternative embodiment, the click chemistry of step three can be performed prior to the second step of grafting norbornene or another strained alkene onto the PBAE-diacrylate backbone.

Figure 3:
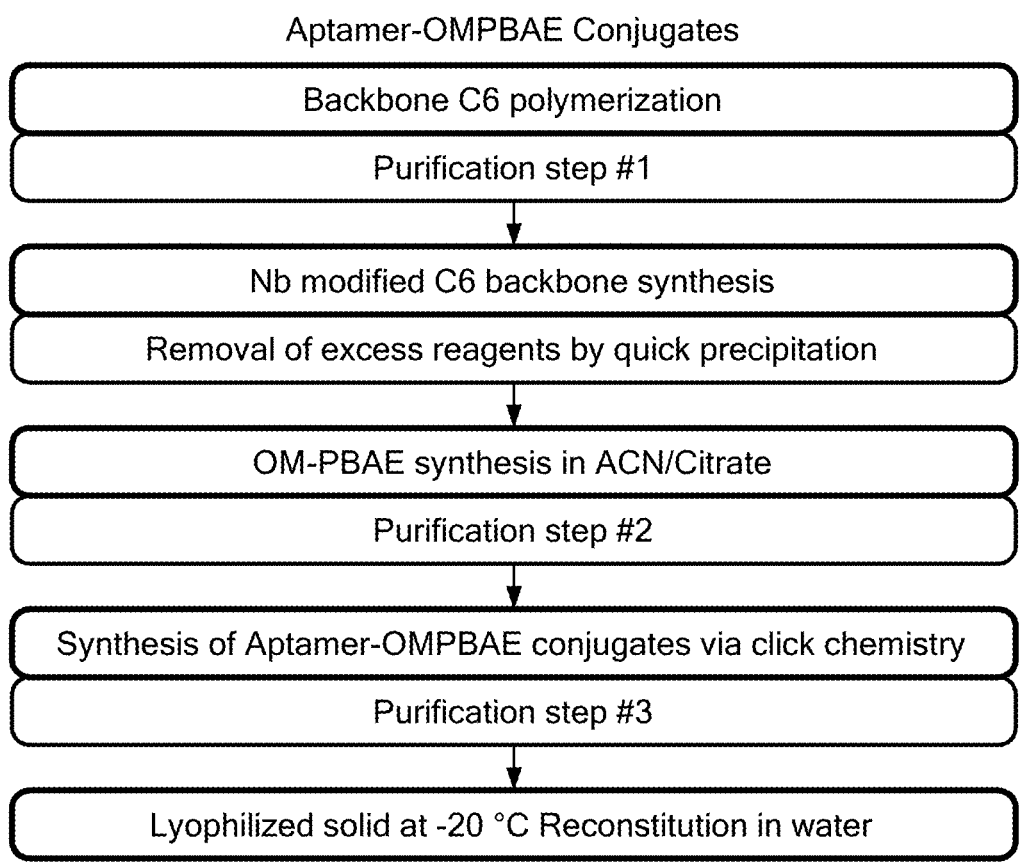
FIG. 3 shows a flow chart of an embodiment of the synthesis of an aptamer conjugated OM-PBAE, as an example of a targeting ligand conjugated OM-PBAE.

As discussed above, the final adducts of the IEDDA click chemistry can be used as, and the "Purification step #3" (and lyophilization, reconstitution) depicted in FIG. 3 can be minimal, optional, or avoided, to provide a ready to use kit for attachment of targeting moieties to OM-PBAEs. Utilizing the aqueous approach disclosed herein, the use of organic solvents can be partially or entirely avoided. For example, a DMSO-free synthesis of OM-PBAEs is described in WO2021/053400A2, which is incorporated by reference herein in its entirety.

An example structure of a PBAE-diacrylate precursor is depicted below in Formula 1.

Formula 1

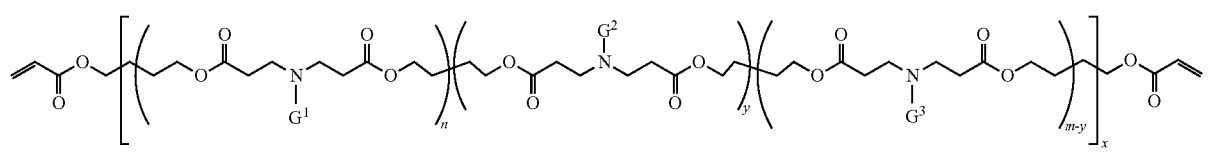

Side chains $G^1$, $G^2$, and $G^3$ can each be independently selected from H or from the structure shown below in Formula 2, with the proviso that at least one of $G^1$, $G^2$, and $G^3$ has a structure according to Formula 2, wherein T can be hydrogen, a strained alkene, a strained alkene ring, —N-azide, azide, or —OH, and "a" is 3, 4, 5, 6, 7, 8, 9, or 10.

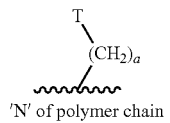

Formula 2

A strained alkene ring can be utilized for IEDDA click chemistry as depicted in Reaction 1 below.

Reaction 1
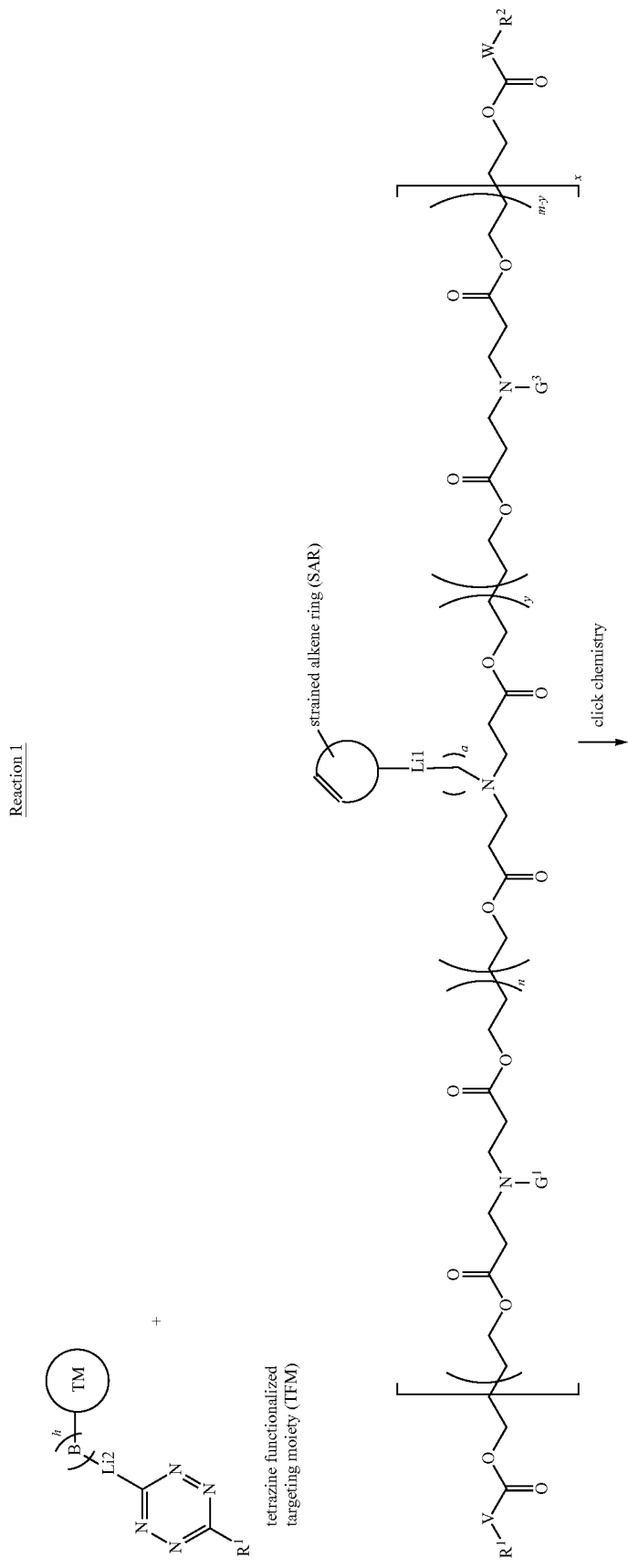

-continued
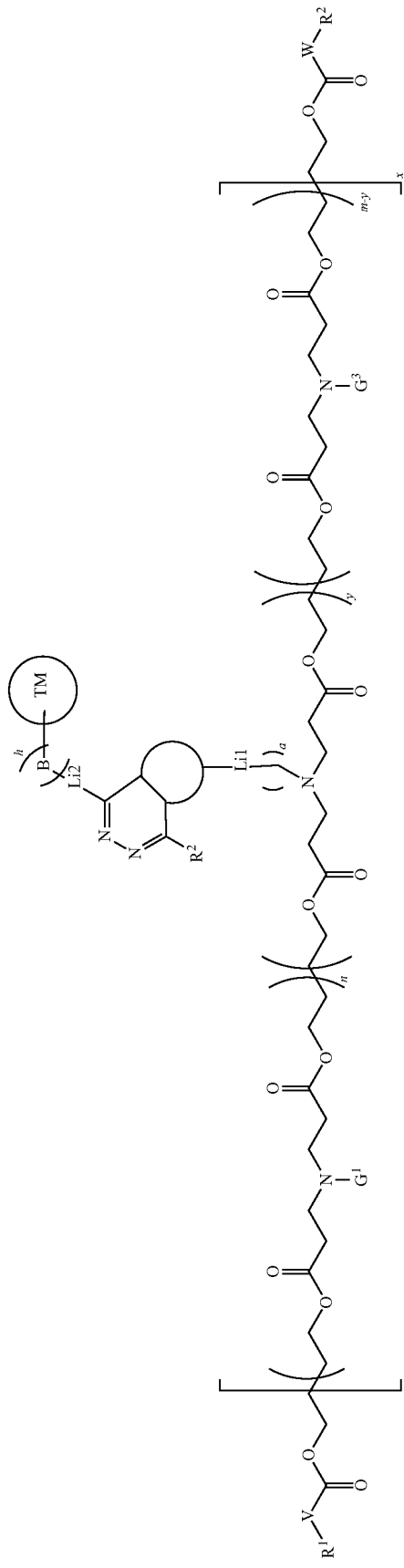

A strained alkene ring including an attached carboxylic acid can be used to form an ester as illustrated in Reaction 2 below. The strained alkene ring may be of different sizes, so the minimum value of "a" above takes into consideration steric effects upon reactive approach of a strained alkene ring including a carboxylic acid to form the ester. An ester can be formed between a strained alkene ring (or a strained alkene) and one or more side chains of a PBAE-diacrylate precursor as depicted in the example Reaction 2 below.

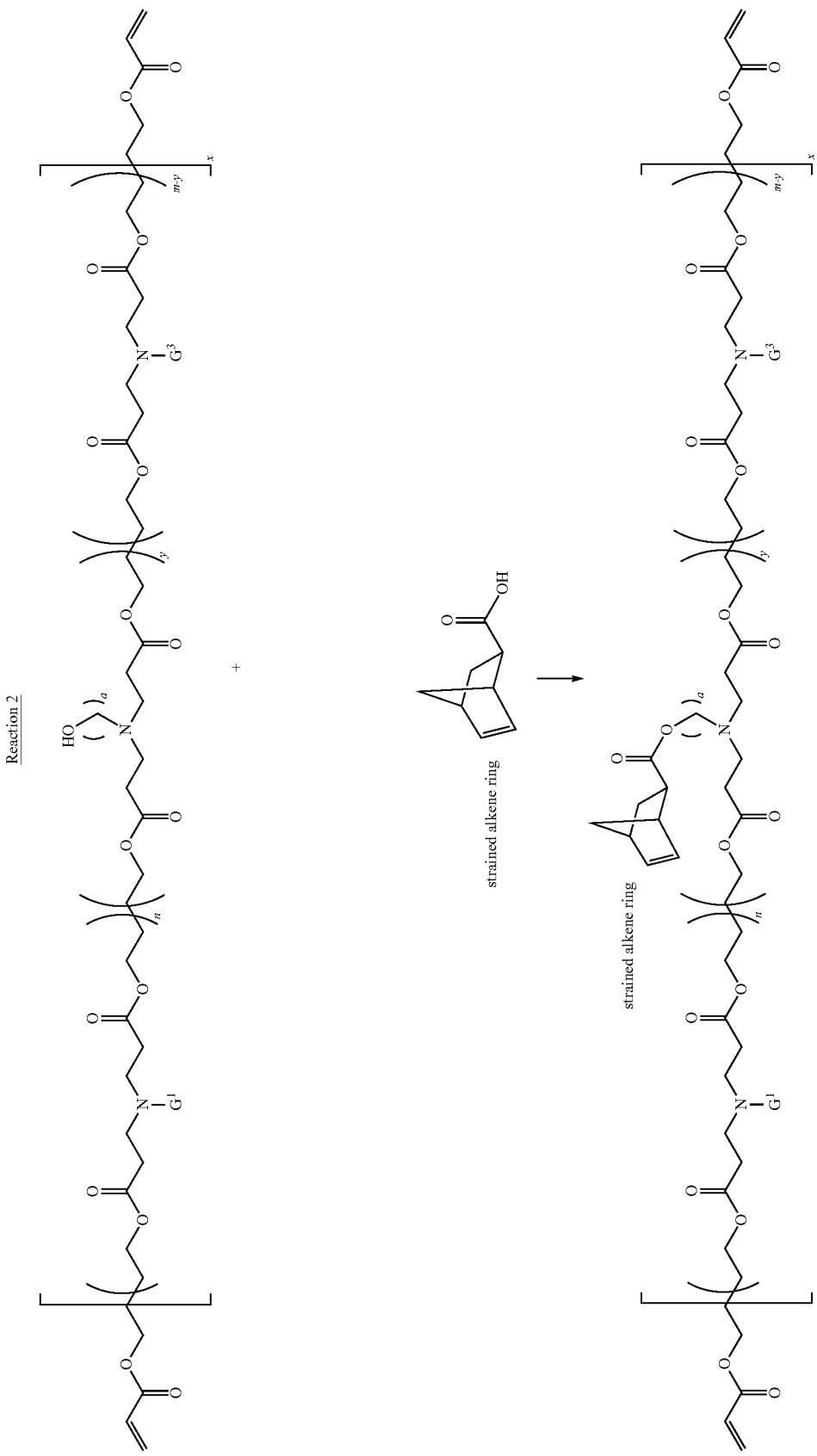

An exo-norbornene is depicted in Reaction 2, but the ester formation can include any strained alkene. An advantage of Reaction 2 is the utilization of the terminal diacrylates to avoid a reaction (e.g., ester formation) at the PBAE ends. For IEDDA, a variety of strained alkenes or strained alkene rings can be utilized and can be introduced as strained alkene rings to avoid reaction by-products after the subsequently enabled click chemistry. In Reaction 2, a highly strained alkene ring is shown to subsequently enable click chemistry in high yield using simple reagents (e.g., aqueous solution), which can be employed, for example, in a ready to use kit for attachment of selected targeting moieties to PBAEs without significant by-products. The strained alkene ring depicted in Reaction 2 is exo-5-norbornenecarboxylic acid.

Figure 1:
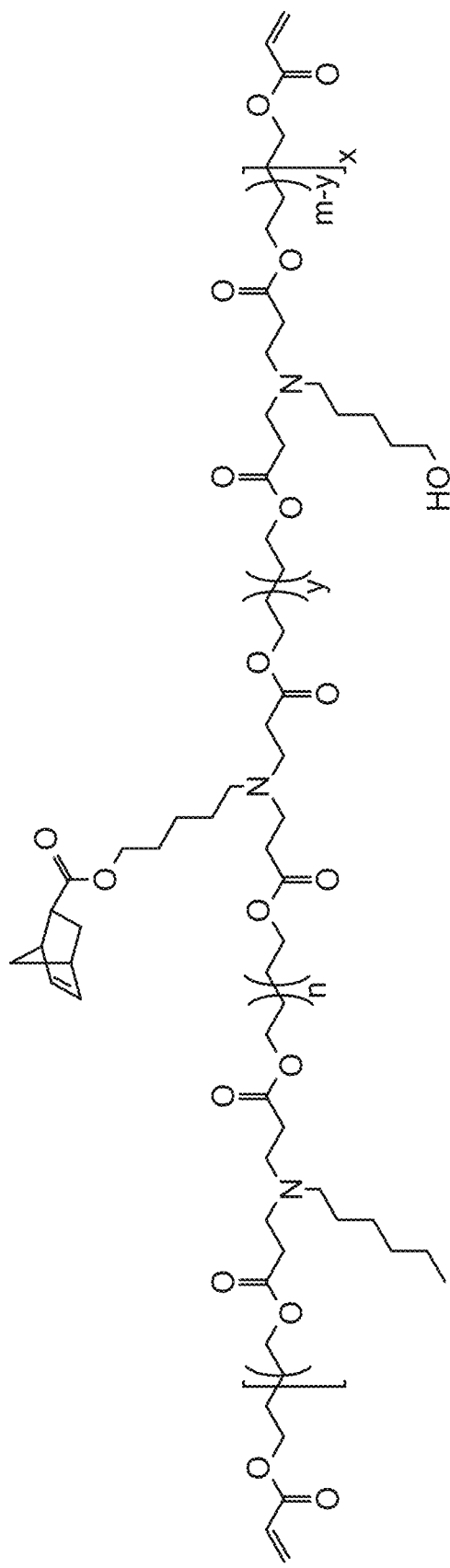
FIG. 1 shows the structure of norbornene (Nb) modified PBAE-diacrylate polymer. "n" is the number of repeat units of C6 functional building blocks. "y" represents the number of norbornene functional repeat units. "m-y" is the number of —OH terminated side chain containing repeat units. "x" is the total number of repeat units giving the degree of polymerization (DP). m is the total number of —OH terminated side chain containing repeat units before the norbornene modification.

Strain on the ring system can involve subtle differences in the ring or ring system. The effects of stereochemistry on the strained alkene ring are demonstrated by the endo-5-norbornenecarboxylic acid reacting significantly more slowly with 1,2,4,5-tetrazines than the exo-5-norbornenecarboxylic acid. Examples of other suitable strained alkenes including a carboxylic acid (SA) are electron-rich dienophiles (cyclopropene, or cyclooctene compound) including trans-cyclooctene with different fused ring derivatives thereof and methyl cyclopropene. In an example, the strained alkene or strained alkene ring can only include norbornene. An example using the exo-5-norbornenecarboxylic acid and 5 carbons ("a" in Formula 2=5) is depicted in FIG. 1. After attachment of the strained alkene, the terminal diacrylates can be end-modified, for example, as shown in Formula 3.

acids, such as D or E, up to a maximum of 20 amino acid residues. Exemplary amino acid sequences include CH, CHH, CHHH (SEQ ID NO:1), CHHHH (SEQ ID NO:2), CHHHHH (SEQ ID NO:3), CR, CRR, CRRR (SEQ ID NO:4), CRRRR (SEQ ID NO:5), CRRRRR (SEQ ID NO:6). CK, CKK, CKKK (SEQ ID NO:7), CKKKK (SEQ ID NO:8), CKKKKK (SEQ ID NO:9), CE, CEE, CEEE (SEQ ID NO:10), CEEEE (SEQ ID NO:11), CEEEEE (SEQ ID NO:12), CD, CDD, CDDD (SEQ ID NO:13), CDDDD (SEQ ID NO:14), CDDDDD (SEQ ID NO:15), CHRH (SEQ ID NO:16), CHRR (SEQ ID NO:17), CHKH (SEQ ID NO:18), CHKK (SEQ ID NO:19), CHEH (SEQ ID NO:20), CHEE (SEQ ID NO:21), CHDH (SEQ ID NO:22), CHDD (SEQ ID NO:23), CRHR (SEQ ID NO:24), CRHH (SEQ ID NO:25), CRKR (SEQ ID NO:26), CRKK (SEQ ID NO:27), CRER (SEQ ID NO:28), CREE (SEQ ID NO:29), CRDR (SEQ ID NO:30), CRDD (SEQ ID NO:31), CKHK (SEQ ID NO:32), CKHH (SEQ ID NO:33), CKRK (SEQ ID NO:34), CKRR (SEQ ID NO:35), CDHD (SEQ ID NO:36), CDHH (SEQ ID NO:37), CDRD (SEQ ID NO:38), CDRR (SEQ ID NO:39), CDKD (SEQ ID NO:40), CDKK (SEQ ID NO:41), CEHE (SEQ ID NO:42), CEHH (SEQ ID NO:43), CERE (SEQ ID NO:44), CERR (SEQ ID NO:45), CEDE (SEQ ID NO:46), and CEDD (SEQ ID NO:47).

Oligopeptides of the present technology also can be cell penetrating peptides, such as GRKKRRQRRRPQ (TAT) (SEQ ID NO:48), RQIKIWFQNRRMKWKKGG (penetra- Formula 3

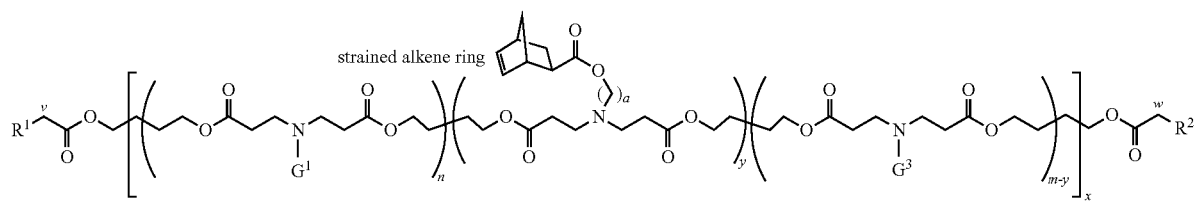

The $R^1$ and $R^2$ groups shown in Formula 3 can be independently acrylate (including a terminal $H_2$) or selected from any chemical structure that will not compete or interfere with the subsequent click chemistry. The $R^1$ and $R^2$ groups shown in Formula 3 can be independently selected from any desired polymers including biomolecules, nucleic acids, nucleotides, oligonucleotides, peptides, oligopeptides, polypeptides, saccharides, or polysaccharides. Preferably, $R^1$ and $R^2$ are selected from oligopeptides, more preferably from tetrapeptides.

Oligopeptides can have any amino acid sequence. The sequence can contain, for example, an N-terminal cysteine and one or more positively charged amino acids, such as any combination of H, R and K, up to a maximum of 20 amino acid residues. The sequence can contain, for example, an N-terminal cysteine and one or more negatively charged amino acids, such as any combination of D and E, up to a maximum of 20 amino acid residues. The sequence can contain, for example, an N-terminal cysteine and one or more positively charged amino acids, such as H, R or K, combined in any order with any negatively charged amino tin) (SEQ ID NO:49), CGYGPKKKRKVGG (NLS sequence) (SEQ ID NO:50), AGYLLGKINLKALAALAK-KIL (transportan10) (SEQ ID NO:51), KETWWETWW-TEWSQPKKKRRV (pep-1) (SEQ ID NO:52), KLALKLA-LKALKAALKLA (MAP) (SEQ ID NO:53), RRRRNRTRRNRRRVR (FHV coat) (SEQ ID NO:54), and LLIILRRRIRKQAHAHSK (pVEC) (SEQ ID NO:55). Oligopeptides of the present technology also can be integrin-binding peptides such as RGD or other integrin-binding peptides.

A thiol-Michael addition reaction can be utilized to add oligopeptides to the PBAE diacrylate. In an example, to attach CRRR (SEQ ID NO:4) through the cysteine sulfur as depicted in Formula 4 below, forming a thiol-ether. The thiol-ether is not required, and the peptide could be attached through a peptide bond, thus SEQ ID NO:4 is depicted in Formula 4. Other examples of $R^1$ and $R^2$ groups are shown in Formula 5 and Formula 6. After the $R^1$ and $R^2$ groups are selected, the use of a 1,2,4,5-tetrazine as an example electron-poor diene and the electron-rich dienophile for click chemistry is depicted in FIG. 2.

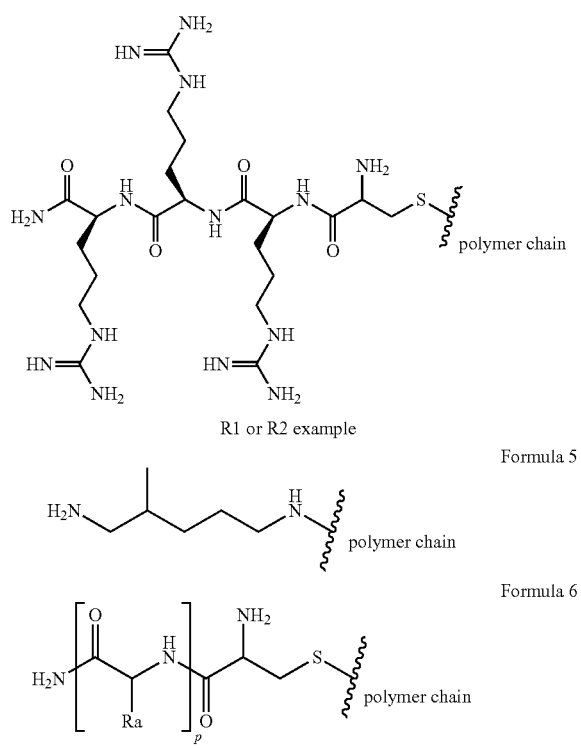

Formula 4

R1 or R2 example

Formula 5

Formula 6

In the example of Formula 6, p can be 19 or less; and $R_a$ can be selected at each occurrence from the group consisting of $H_2NC(=NH)-NH(CH_2)_3-$, $H_2N(CH_2)_4-$, $COO(CH_2)_{(1)}-$, $COO(CH_2)_{(2)}-$, and (1H-imidazol-4-yl)-$CH_2-$.

In an example, a formulation including nanoparticles can be formed by combining one or more OM-PBAEs with a net negative charge and one or more OM-PBAEs with a net positive charge. The individual charges of the OM-PBAEs or the nanoparticles can be changed to tune zeta potentials of the nanoparticles or OM-PBAEs.

The 3-phenyl-1,2,4,5-tetraazine (or tetrazine) depicted in FIG. 2 includes the phenyl, for example, to take into consideration steric hindrance upon the kinetics when an aptamer, targeting moiety, multispecific aptamer, or antibody (depicted as star in FIG. 2) is attached. The 3-methyl-6-phenyl-1,2,4,5-tetrazines can be used, or any other suitable 1,2,4,5-tetrazines can be implemented (e.g., Formula 10). The example depicted in FIG. 2 can enable an aqueous kit for click chemistry.

In FIG. 3, the "Backbone C6 polymerization" can be accomplished by synthesizing a PBAE-diacrylate polymer (e.g., Formula 1) using primary amine and diacrylate functional monomers. For example, 5-amino-1-pentanol, 1-hexylamine, and 1,4-butanediol diacrylate can be mixed at a molar ratio of 2.2:1, acrylate to primary amine groups, at about 90° C. for about 20 hours. The purification step #1 can be accomplished with a precipitation and optional wash in heptane or other suitable solvent. The addition of strained alkene (e.g., Reaction 2) is depicted in FIG. 3 as "Nb modified C6 backbone synthesis". PBAE-diacrylate polymer can be attached to a strained alkene using any chemistry known in the art, for example, a suitable addition reaction between an —OH or azide from a side group (Formula 2). The ester formation is demonstrated herein as an easy to use approach.

In the case of —OH, an esterification between —OH groups on one or more side chains of PBAE and a carboxylic acid group of the strained alkene, with a suitable base, can be utilized in a suitable solvent (e.g., THF) with a coupling reagent, for example DCC. Subsequent purification, for example, can be accomplished after addition of DCC, by precipitation, centrifugation and solvent removal.

Addition of the $R^1$ and $R^2$ groups can be accomplished, for example, by dissolving the PBAE-diacrylate polymer in acetonitrile. While DMSO can be used, it is difficult to remove and can lead to subsequent biological incompatibility. Separately, the selected $R^1$ and $R^2$ groups can be dissolved in aqueous citrate buffer at about pH 5. Acetonitrile can be added to the citrate after dissolution of the groups. When the citrate buffer solutions are mixed with the PBAE-diacrylate polymer in acetonitrile, the $R^1$ and $R^2$ groups bond to the terminal vinyl carbon to form the end modified polymer (Formula 3). Solvent removal follows. The purified sample, which can be provided as a first reagent ready for click chemistry, is depicted in the examples of Reaction 1 and Formula 3. In a separate preparative reaction, the 1,2,4,5-tetrazine is attached to the targeting moiety as a second reagent for the click chemistry.

In FIG. 3, the "Synthesis of Aptamer-OMPBAE conjugates via click chemistry" can be accomplished in a single click chemistry step, and any subsequent steps can be avoided by the technology. An aptamer or antibody is attached to 1,2,4,5-tetrazine before the click chemistry depicted in FIG. 2. The aptamers are oligonucleotides that bind to a specific target molecule. Examples are synthetic single strand (ss) DNA, XNA (nucleic acid analogue), or RNA molecules that form specific secondary and tertiary structures. For example, a DNA aptamer can be functionalized at the 5' end by attaching an amino modifier to the terminal phosphates. Any suitable attachment chemistry can be used. An example amino modifier is shown in Formula 7, wherein f can be about 3 to about 5 or greater, taking into consideration steric effects, with the terminal phosphate (e.g., 5') of the aptamer.

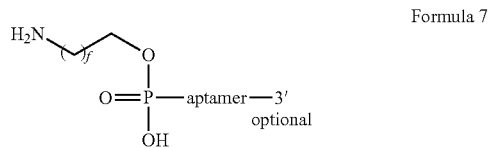

Formula 7

After attachment of the amine, tetrazine functional groups can be added as tetrazine-PEG-NHS (N-hydroxysuccinimide) esters by NHS/EDC (ethyl-dimethylaminopropyl carbodiimide) chemistry, thereby introducing a mixed polarity spacer between the aptamer sequence and the 1,2,4,5-tetrazine. Steric hindrance should be taken into consideration. The use of esters of variable chain length is contemplated, such as esters having from 3 to 12 ethylene glycol units, including penta or hexa ethylene glycol. Other shorter esters can be used, including tetrazine-NHS ester, methyltetrazine-NHS ester, methyltetrazine-sulfo-NHS ester, and methyltetrazine-PEG5-NHS ester. Depending upon the aptamer, if a free 3' hydroxyl is present, subsequent 3' modification can be utilized to enhance resistance to nuclease degradation.

Different classes of antibodies or fragments thereof can be functionalized with 1,2,4,5-tetrazine by attachment of the tetrazine away from the antigen binding site to prevent a reduced activity. An antibody, antibody fragment, a single-chain variable fragment, an antibody-like protein scaffold, an oligopeptide, a spiegelmer, or a ligand for a cell surface receptor (e.g., targeting moiety) can be reacted similarly. In an example, a 1,2,4,5-tetrazine can be attached to a targeting moiety by a release of the single-chain variable fragment by thiol-disulfide exchange with 2-mercaptoethane sulfonate (Mesna). A cleavage reaction at an N-terminal peptide and formation of a thioester with Mesna at the carboxy-terminus can be exploited to react the thioester with a primary amine and a linker. The phosphate depicted in Formula 7 can then be contemplated as a sulfonate, and the aptamer is the antibody or other moiety, as is generally depicted in Formula 8, wherein e is about 3-5 or greater. The tetrazine-containing moiety can then be attached to the primary amine via a tetrazine-PEG-N—NHS ester as described above.

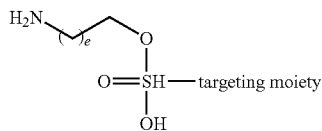

Formula 8

Combined aptamers or multispecific aptamers can be utilized by linking two or more before or after the attachment of a 1,2,4,5-tetrazine. For example, by using more than one target-binding aptamer, each having binding specificities for different targets, and a linker connecting the aptamers. Any aptamer developed through a SELEX approach (systematic evolution of ligands by exponential enrichment) or its variations and amplified through PCR can be attached through a phosphate, for example as shown in Formula 7. The aptamers can have any desired length. The aptamers may include at least about 8 nucleotides up to about 130.

Other click chemistry approaches can be used, such as those utilizing an azide, "T", of Formula 2; however, the technology avoids further steps after the click chemistry reaction, so that targeting moieties can be rapidly attached to OM-PBAEs.

Figure 4:
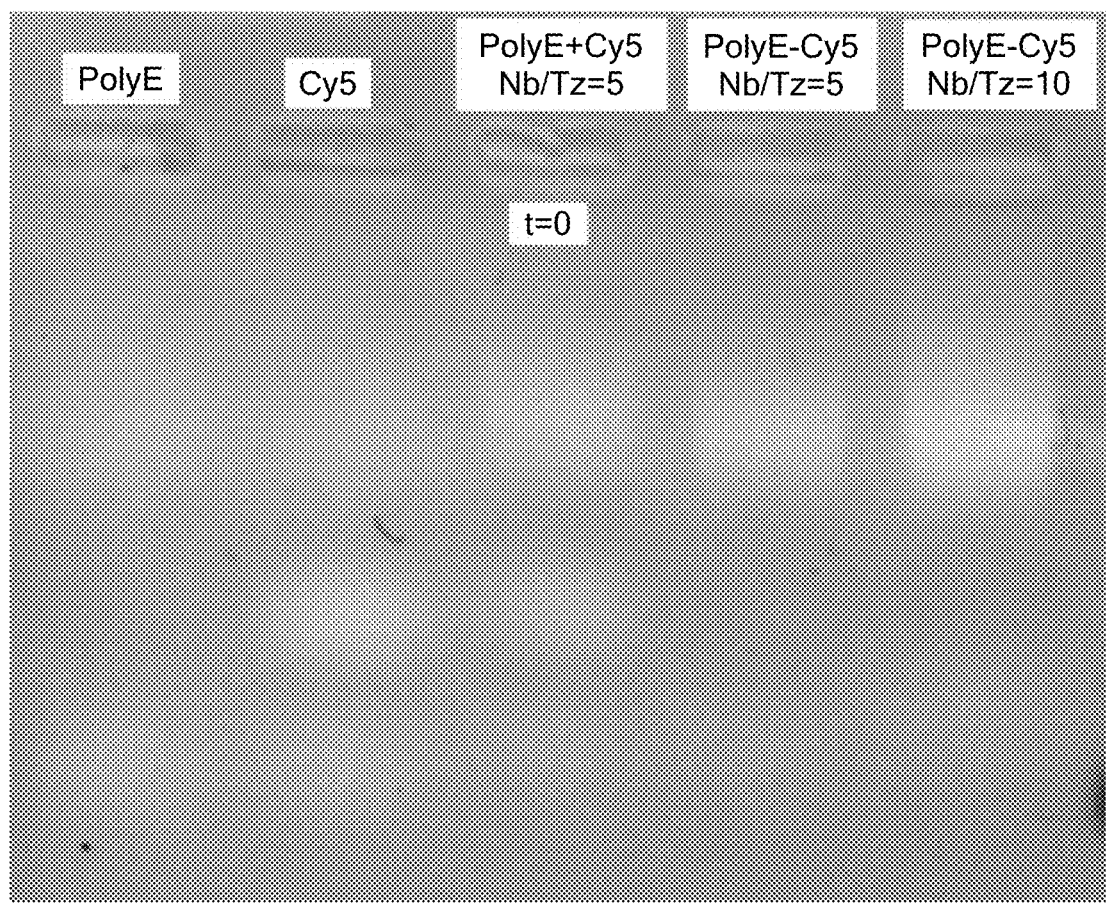
FIG. 4 shows agarose gel analysis of IEDDA click chemistry adducts of a Nb modified PBAE and a Tz modified fluorophore. The first lane represents Nb-modified PBAE, Nb-CEEE-PBAE (Nb-SEQ ID NO:10-PBAE) alone, labeled as "PolyE". The second lane depicts Tz functionalized fluorophore, sulfo-Cy5, labeled as "Cy5". The third lane is marked as "PolyE+Cy5, Nb/Tz=5, t=0" for the mixture of click chemistry reactants (Nb-CEEE-PBAE (Nb-SEQ ID NO:10-PBAE) and Tz-Sulfo-Cy5) at t=0. The fourth lane is the IEDDA click chemistry adduct at Nb/Tz ratio of 5 after 15 minutes and is labeled as "PolyE-Cy5, Nb/Tz=5". The fifth lane is the click chemistry adduct at Nb/Tz=10 after 15 minutes and is labeled as "PolyE-Cy5, Nb/Tz=10".

The IEDDA click chemistry has very fast kinetics and occurs instantaneously in aqueous conditions, since IEDDA click chemistry does not require a catalyst or another reagent. In FIG. 4, 3% agarose gel electrophoresis is used to measure reaction of IEDDA click chemistry performed at a 20 mg scale using 1,2,4,5-tetrazine (Tz) functional Sulfo-Cy5 dye and Nb-functional CEEE-PBAE (Nb-CEEE-PBAE, (Nb-SEQ ID NO:10-PBAE) with distilled water as reaction solvent. Nb-CEEE-PBAE (Nb-SEQ ID NO:10-PBAE) and Tz functional sulfo-Cy5 are reacted at Nb/Tz ratios of 5:1 (second from right lane) and 10:1 (far right lane) at Sulfo-Cy5 concentration of 0.5 mM in distilled water at a final volume of 100 μL for 15 minutes. The click chemistry between Nb-CEEE-PBAE and Tz functional sulfo-Cy5 reaches completion in 15 minutes. The center lane of FIG. 4 shows t=0, and the free sulfo-Cy5 band is observed, but there is already a band corresponding to the formation of click chemistry adduct. The second from left lane is control for sulfo-Cy5 (Cy5), and the far left lane is control for Nb-CEEE-PBAE.

The strained alkene ring (SAR) is incorporated into a chain after the targeting moiety is attached by click chemistry. Selected functional groups can be included on the SAR, but functional groups that can disrupt the nontoxicity or hydrogen bonding of the resulting targeted OM-PBAE can be envisioned and avoided (e.g., —CN nitrile or charged groups). Substituents that cause an immune response can be avoided.

The present technology enables quick attachment of aptamers, antibodies, antibody fragments, scFvs, antibody-like protein scaffolds, oligopeptides, spiegelmers, and ligands for cell surface receptors to OM-PBAEs. A kit can be provided including one or more targeting moieties and OM-PBAEs. Using aqueous chemistry, the click chemistry can be done and with minimal or avoided further cleanup, a delivery tool is provided to advance the technology.

After attachment of a targeting moiety, a nanoparticle or OM-PBAE provided herein can be utilized as a delivery system, such as for immunotherapy or gene therapy applications. A composition or formulation containing such nanoparticles can serve as a drug product used in the prevention, treatment or amelioration a proliferative disease, a tumorous disease, an inflammatory disease, an immunological disorder, an autoimmune disease, an infectious disease, viral disease, allergic reactions, parasitic reactions, graft-versus-host diseases or host-versus-graft diseases in a subject in the need thereof, metabolic disease, neurologic disease, ophthalmic diseases. In another example, the technology can be utilized in diagnostic applications, medical imaging applications, purification systems, and cell selection or enrichments applications.

In some embodiments, nanoparticles containing the targeted PBAEs made by the present technology can be used to allow for an immune effector cell to be redirected to a cancer cell. The targeting moiety can redirect immune effector T-cells expressing CD3, CD8, CD4, or other T-cell specific antigens to other cellular targets of interest such as CD19, epithelial cell adhesion molecule, CD20, CD22, CD123, BCMA, B7H3, CEA, PSMA, Her2, CD33, CD38, DLL3, EGF-R, MHC class I-related protein MR1 or Mesothelin. In some embodiments, the targeting moiety can redirect an immune effector NK cell such as via a CD16A, NKG2D, or other NK-cell specific antigen to other cellular targets of interest such as CD30, CD19, Epithelial cell adhesion molecule, CD20, CD22, CD123, BCMA, B7H3, CEA, PSMA, Her2, CD33, CD38, DLL3, EGF-R, MHC class I-related protein MR1 or Mesothelin. The targeting moiety can bind to targets such as PD-1, PD-L1, CTLA04, Lag-3, TIM-3, or OX40) and tumor microenvironment (TME) regulators such as CD47 or VEGF, or can target one or more tumor associated antigens such as PRAME, NY-ESO-1, MAGE A4, MAGE A3/A6, MAGE A10, AFP. The targeting moiety can target antigens involved in an inflammatory or autoimmune disease, cardiometabolic disease, respiratory disease, ophthalmic disease, neurologic disease, or infectious disease.

In some embodiments, the targeting moiety is capable of activating and stimulating immune effector cells to kill cells expressing specific targeted antigens. In some embodiments, the nanoparticle can serve as a delivery system (e.g., gene therapy applications). In some embodiments the targeted nanoparticle can be used in diagnostic applications. In some embodiments, the targeted PBAE can be used in purification systems, such as for cell selection or enrichment applications.

EXAMPLES

Example 1. Synthesis and Purification of Norbornene-Modified OM-PBAE Polymers and Tetrazine-Modified Targeting Agents for IEDDA Click Chemistry Synthesis, Purification and Characterization of PBAE-Diacrylate Polymers Poly (β-amino ester)-diacrylate (PBAE-diacrylate) polymer was synthesized via addition type polymerization using primary amine and diacrylate functional monomers. 5-amino-1-pentanol (Sigma-Aldrich, 95.7% purity, 3.9 g, 36.2 mmol), 1-hexylamine (Sigma-Aldrich, 99.9 purity, 3.8 g, 38 mmol) and 1,4-butanediol diacrylate (Sigma-Aldrich, 89.1% purity, 18 g, 81 mmol) were mixed in a round bottom flask at molar ratio of 2.2:1, acrylate to primary amine groups. The mixture was stirred at 90° C. for 20 h. Then, the crude product, a light-yellow viscous oil, was obtained by cooling the reaction mixture to room temperature. Synthesized PBAE-diacrylate polymers were purified by precipitation in heptane. Crude product was dissolved in ethylacetate and added dropwise into excess heptane (1/10, v/v), this procedure being repeated twice. Purified PBAE-diacrylate using ethylacetate/heptane (1/10, v/v) was obtained at the 50 g scale with an 86% yield and characterized by gel permeation chromatography using THF as eluent to have MW and Mn of 5300 g/mol and 3100 g/mol, respectively.

Synthesis, Purification and Characterization of Norbornene (Nb) Modified PBAE-Diacrylate PBAE-diacrylate polymer was modified by norbornene (Nb) groups via esterification reaction between —OH groups on the side chain of PBAE and carboxylic acid of Nb. Purified PBAE diacrylate (1 g, 0.33 mmol), exo-norbornene carboxylic acid (Sigma-Aldrich, 97% purity, 69 mg, 0.5 mmol) and 4-dimethylaminopyridine (Sigma-Aldrich, 98% purity, 6 mg, 0.05 mmol) were added to a reaction vessel and stirred in 9 ml of anhydrous THF for 10 minutes. Then, the reaction mixture was cooled down to 0° C. on ice and stirred for an additional 30 minutes. Next, DCC reagent (Sigma-Aldrich, 99% purity, 103 mg, 0.5 mmol) was added to the reaction mixture at 0° C. and stirred for 1 h, then the reaction mixture was gradually heated up to 25° C. and stirred further for 20 h.

After the completion of the reaction, 1,3-dicyclohexylurea (DCU) by-product precipitate was removed from the solution via centrifugation. THF was evaporated under reduced pressure. 5 g of the resulting product were re-dissolved in 2 ml of ethylacetate and centrifuged again to remove residual DCU precipitate. Ethylacetate was removed under reduced pressure and final product was characterized using 1H-NMR, 13C-APT and 2D-COSY NMR techniques to confirm the Nb grafting onto the PBAE backbone. Structure was confirmed by MALDI-TOF analysis.

Synthesis, Purification and Characterization of OM-PBAE from Nb-Modified PBAE-Diacrylate Nb-modified PBAE-diacrylate polymer (1 eq.) was end-capped using a free thiol-containing tetra-peptide, Cys-Glu-Glu-Glu (CEEE, SEQ ID NO:10) (2.8 eq) via a thiol-Michael addition reaction. The coupling reaction was carried out under DMSO-free conditions, using acetonitrile/citrate (25 mM, pH 5.0) (3/2, v/v) under an inert nitrogen atmosphere. After the reaction, the acetonitrile/citrate mixture was removed under reduced pressure at 40° C. Further, crude product was purified via Sephadex G-10 prepacked columns at a concentration of 80 mg/ml using MilliQ water as eluent. 1 g scale batch of purified product was recovered by lyophilization and stored at −20° C. for further use. Nb-CEEE-PBAE (Nb-SEQ ID NO:10-PBAE) product was characterized using 1H-NMR and GPC (Mn=4900 g/mol, Mw=11400 g/mol, PDI=2.3) to confirm the structure and HPLC using a C18 BEH column to determine the residual free peptides. Structure was confirmed by MALDI-TOF analysis.

Synthesis, Purification and Characterization of Tetrazine-Modified Aptamers

DNA aptamer CD3_CELTIC_core40HEGt (GGGTTTGGCATCGGGTCTGGC, SEQ ID NO 56) has been previously selected against human CD3. 10 mg batches were obtained from Eurogentec Kaneka (Liege Belgium) as HPLC-RP purified single stranded oligos synthetized via standard solid phase phosphoramidite chemistry. Other aptamers can be substituted for SEQ ID NO:56 which have specific binding affinity for CD3 or another desired target. The 5'-ends of the aptamers were then functionalized with primary amines via a C6 amino modifier added to terminal phosphates. The 5' amino modifier was utilized to facilitate subsequent attachment of tetrazine, and the length of the modifier was considered in light of steric effects. Tetrazine functional groups were added as tetrazine-PEG5-NHS esters via standard NHS/EDC chemistry, introducing a 16-atom mixed polarity spacer between the aptamer sequence and the tetrazine flag. 3'-3' deoxy-thymidine modification was added as a strategy to enhance resistance to nuclease degradation. Molecular weight, purity and integrity of modified aptamers were verified by HPLC-MS. Affinity and specificity of anti-CD3 aptamers were evaluated on CD3 positive and CD3 negative cells. This anti-CD3 aptamer did not activate cytokine secretion or surface marker expression even when combined with costimulatory anti-CD28 antibody, and unlike anti-CD3 monoclonal antibodies (data not shown).

Example 2. Functionalization of Norbornene-Modified OM-PBAE Polymers Via IEDDA Click Chemistry Click Chemistry Using Nb-OM-PBAE and Tetrazine (Tz) Functional Sulfo-Cy5

IEDDA click chemistry was performed at the 20 mg scale using 1,2,4,5-tetrazine (Tz) functional sulfo-Cy5 dye (SulfoCy5-tetrazine, Broadpharm) and Nb-functional CEEE-PBAE (Nb-CEEE-PBAE, (Nb-SEQ ID NO:10-PBAE). Distilled water was used as reaction solvent. (Nb-SEQ ID NO:10-PBAE) Nb-CEEE-PBAE and Tz functional sulfo-Cy5 were reacted at Nb/Tz ratios of 5:1 and 10:1 at sulfo-Cy5 concentration of 0.5 mM in distilled water at a final volume of 100 μL for 15 minutes. Click chemistry between Nb-CEEE-PBAE and Tz functional sulfo-Cy5 reached to completion in 15 minutes, which was confirmed by 3% agarose gel electrophoresis (FIG. 4). 3% agarose gel was prepared in 1×TBE buffer and run at 100V for 25 minutes. Nb-CEEE-PBAE, sulfo-Cy5-tetrazine and a mixture of Nb-CEEE-PBAE and sulfo-Cy5-tetrazine at Nb/Tz ratio of 5 at t=0 were also loaded in 3% agarose gel as control groups (FIG. 4). In the case of mixture of Nb-CEEE-PBAE and sulfo-Cy5-tetrazine at Nb/Tz ratio of 5 at t=0, one could observe free sulfo-Cy5 band. But at the same time, there was already a band corresponding to the formation of click chemistry adduct. Altogether, these results demonstrate that IEDDA click chemistry has very fast kinetics and occurs instantaneously in aqueous conditions, since IEDDA click chemistry does not require a catalyst or another reagent.

Click Chemistry Using Nb-CEEE-PBAE and Tz-Functional CD3 Targeting Aptamer

200 µM aptamer and 5 mM Nb-CEEE-PBAE (Nb-SEQ ID NO:10-PBAE) stock solutions were used in all the reactions. First set of reactions were performed in a 50 µL of reaction volume. Later, 100 µL reaction volume was used for purification studies and for further characterization reaction volume was increased up to 2 mL. Different amounts of DMSO were included in the reaction medium to improve the overall solubility of Nb-CEEE-PBAE.

Therefore, 5 mM Nb-CEEE-PBAE solution was prepared in 50% DMSO further to be used in the reactions. Therefore, Nb/Tz ratio of 2, 4, 10 and 15 were tested at 2%, 4%, 10% and 15% final DMSO concentrations in distilled water. Agarose gel analysis indicated that increasing Nb/Tz ratio decreases the intensity of band corresponding to free, non-conjugated aptamer molecules. In addition, UV-signals of click chemistry reaction products also demonstrated the differences compared to free polymer and aptamer species.

Figure 5B:
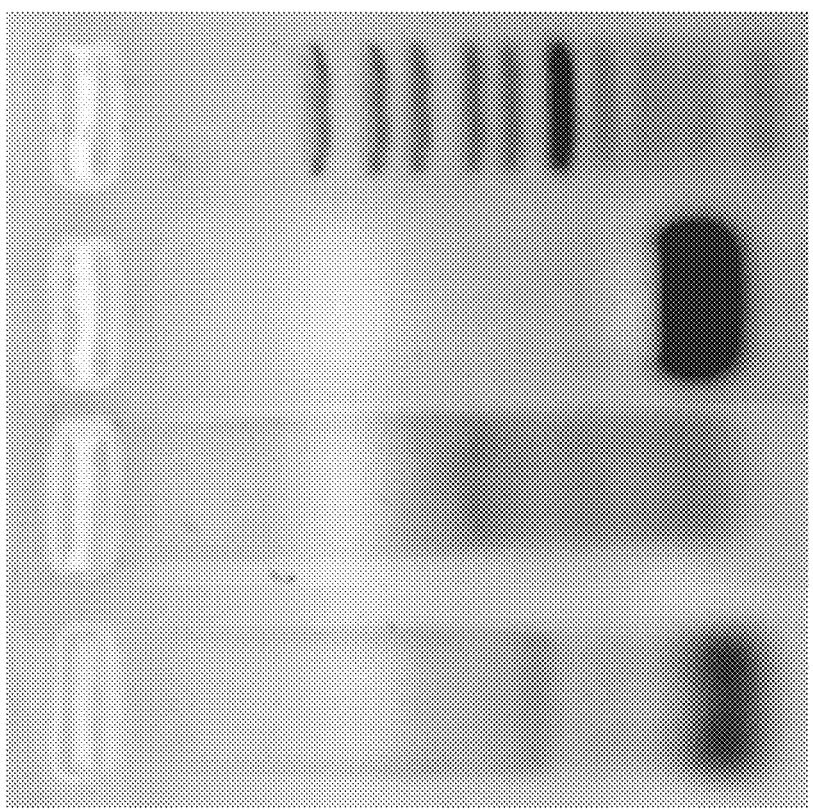
FIG. 5A shows UV-vis spectroscopy analysis and FIG. 5B shows agarose gel analysis of IEDDA click chemistry adducts of Nb-modified polymer (Nb-CEEE-PBAE or Nb-SEQ ID NO:10-PBAE) and Tz-modified aptamer at Nb/Tz ratios of 10 to 15 after purification by size exclusion spin columns.
Figure 5A:
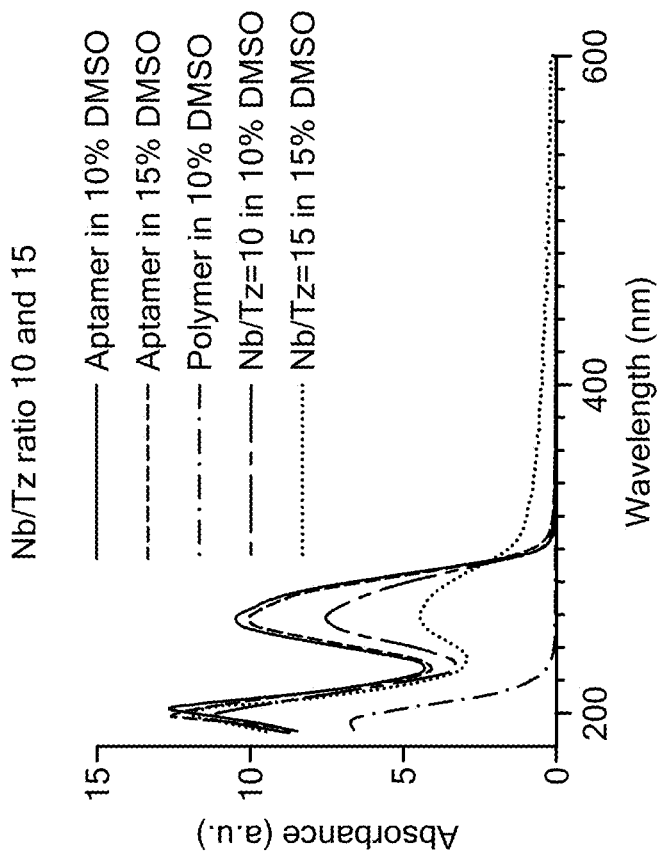

Reaction mixtures were further purified using BioSpin6 size exclusion columns with a MWCO of 6 kDa to remove DMSO and free polymers after the reaction. BioSpin6 columns were in SCC buffer; therefore, a buffer exchange step was applied. First, storage buffer was eluted at 1000×g for 2 minutes. Then 500 µL of DNase/RNase free water was applied and centrifuged at 1000×g for 1 minute. This second step was repeated 4 times. Then 40 or 50 µL sample was loaded, centrifuged at 1000×g for 4 minutes and 50 or 60 µL was collected. The samples were purified 2-times. Nb/Tz ratios of 10 and 15 were tested. Nb/Tz ratio was limited to 15, because the corresponding DMSO concentration that could be added in the reaction medium was limited. IEDDA click chemistry efficiency increased by increasing the Nb/Tz ratio. UV-vis spectra demonstrated a decrease in intensity of the peak corresponding to aptamer at ~260 nm (FIG. 5A). Moreover, the amount of free aptamer detected on the agarose gel significantly decreased at Nb/Tz ratio of 15 compared to Nb/Tz ratio of 10 (FIG. 5B).

Figure 6:
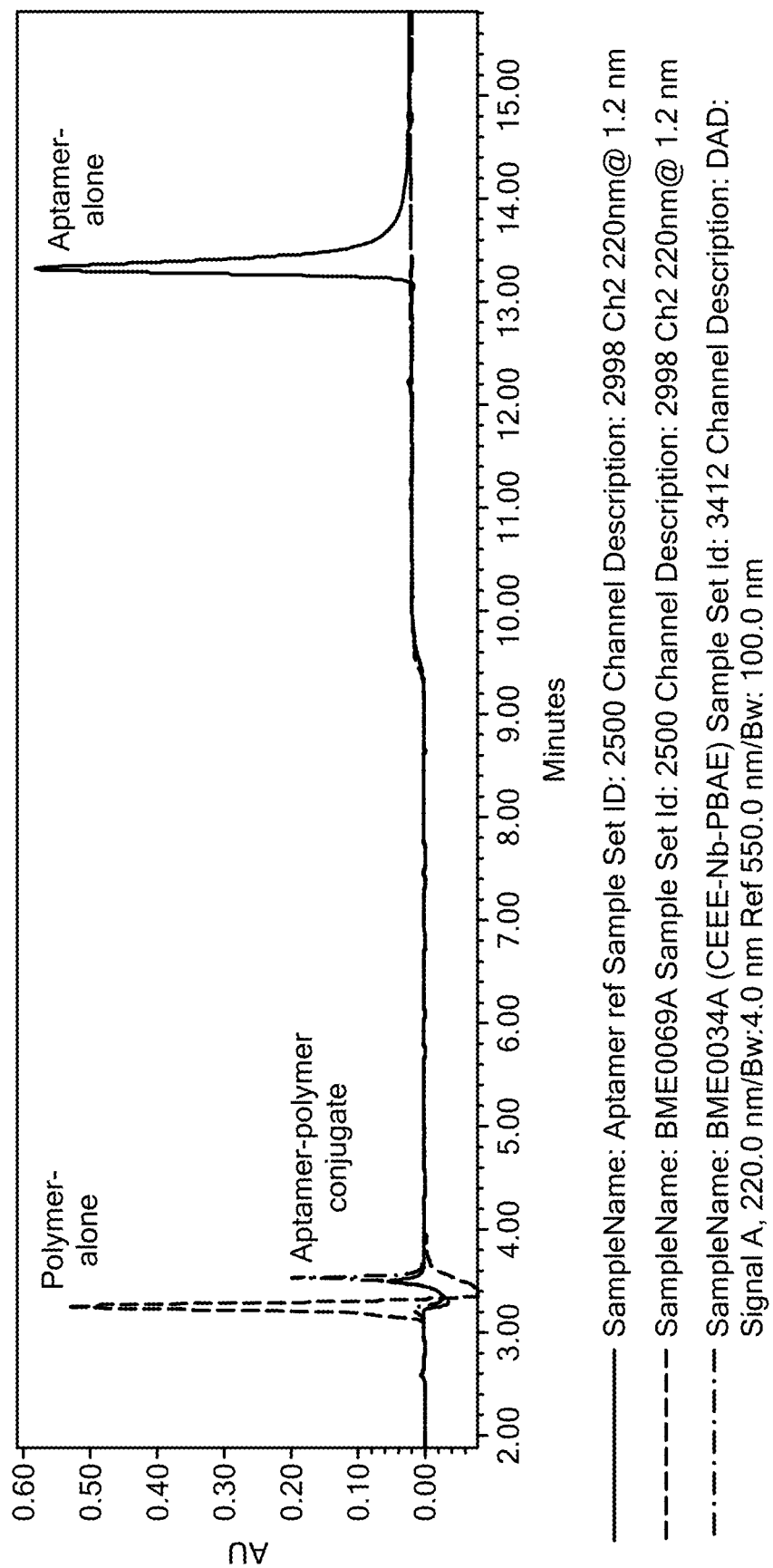
FIG. 6 shows the RP-HPLC analysis of polymer-aptamer conjugate after the purification comparing to polymer-alone and aptamer-alone.

Furthermore, click chemistry reaction at Nb/Tz ratio of 15 was performed at 2 mL scale comprising 1.5 mg aptamer, purified by size exclusion column and final product was recovered by lyophilization and stored at −20° C. for further use. The final product was characterized using RP-HPLC using (Vydac C18 column) by comparing free aptamer and free polymer to aptamer-polymer conjugate (FIG. 6).

Example 3. Retention of Biological Properties and Non-Toxicity of Anti-CD3 Targeting Agents Covalently Grafted on Norbornene-Modified OM-PBAE Polymers Via IEDDA Click Chemistry The biological functionality of OM-PBAE polymers coupled to targeting agents by IEDDA click chemistry was evaluated in vitro on human peripheral white blood cells (PBMCs) with the tetrazine-modified anti-CD3 aptamer, CD3_CELTIC_core40HEGt (SEQ ID NO 6), grafted on Nb-CEEE-PBAE polymer (Nb-SEQ ID NO:10-PBAE). This aptamer was selected because it specifically binds to CD3 receptor on the surface of human T lymphocytes. In contrast to therapeutic anti-CD3 monoclonal antibodies, it does not activate cytokine secretion or surface marker expression even upon binding to its target even when combined with the costimulatory anti-CD28 antibody (data not shown).

Evaluation of the Effects of IEDDA Click Chemistry on Human PBMC Viability

Human Peripheral Mononuclear Cells (PBMCs) were isolated from buffy coats obtained from two healthy donors (Etablissement Français du Sang, Division Rhônes-Alpes, France). After diluting the blood with DPBS, PBMCs were separated over a Ficoll density gradient (GE Healthcare), washed twice with DPBS, resuspended to obtain the desired cell density and cultured in RPMI-1640 medium (Gibco Invitrogen), supplemented with 10% FBS (Gibco Invitrogen) and 1% penicillin/steptomycin (Gibco Invitrogen) at 37° C., 5% CO2. Human PBMCs were seeded in 96-well plates at a density of $2×10^5$ cells per well in RPMI medium containing 10% FBS and 1% penicillin/streptomycin. Cells were then incubated for up to 72 h in presence of anti-CD3 and anti-CD28 monoclonal antibodies (Gibco Invitrogen) at concentrations of 1 µg/mL (7 nM each), 1 µM of anti-CD3 core40HEG alone or 1 µg/mL of anti-CD28 monoclonal antibody (7 nM) or 1 µM of anti-CD3 aptamer/PBAE alone or 1 µg/mL of anti-CD28 monoclonal antibody (7 nM). After 0, 24, 48 and 72 h culture, cells were harvested and stained with the Zombie NIR fixable viability kit (Biolegend) according to manufacturer's instructions. Viable cells were analyzed by flow cytometry (AttuneNXT; Invitrogen, Inc.) by measuring fluorescent cell numbers on the RL3 channel.

Figure 7:
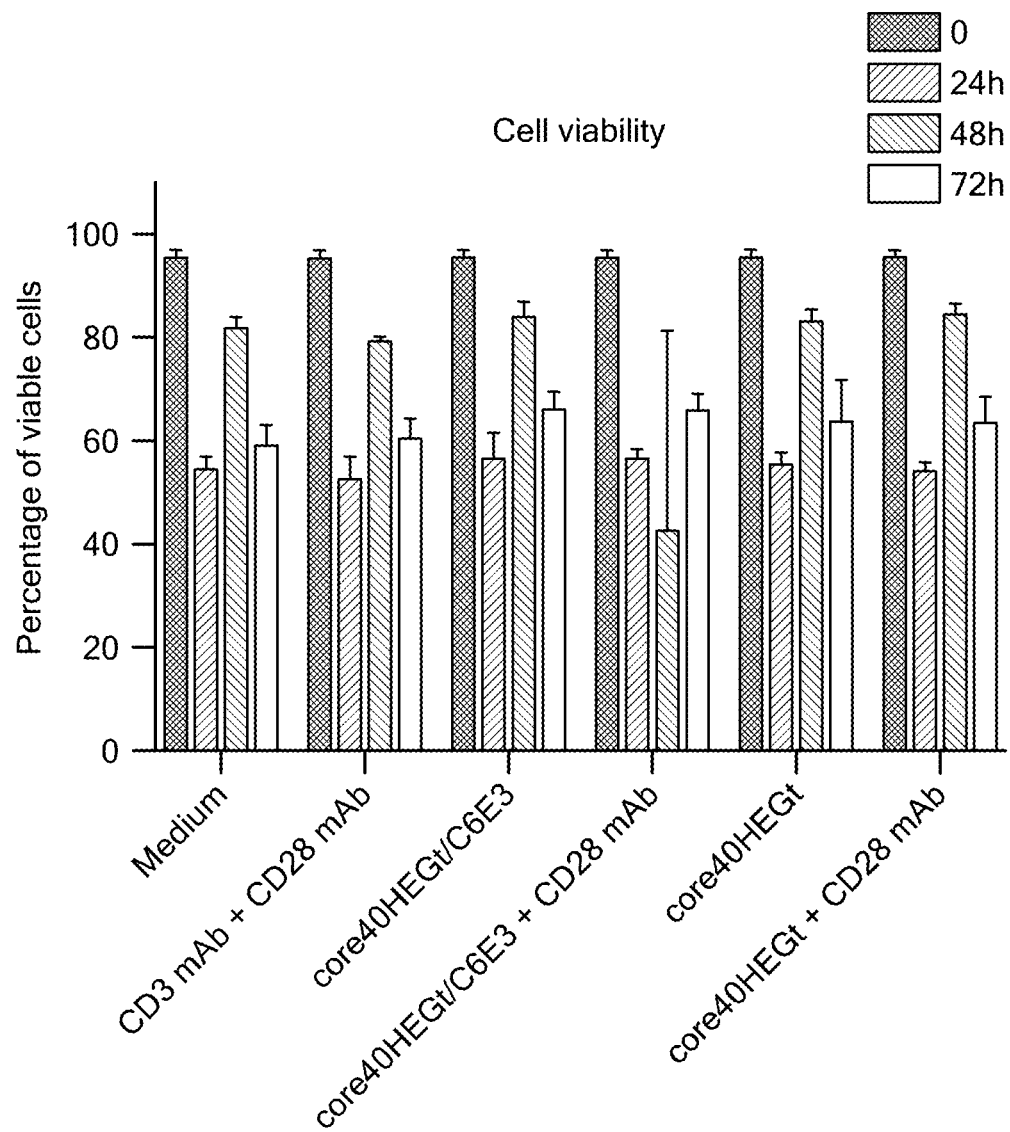
FIG. 7 is a bar graph showing the cell viability of human PBMCs measured by flow cytometry after 0, 24, 48 and 72 h incubation in presence of an anti-CD3 aptamer (core40HEGt), the same anti-CD3 aptamer covalently grafted to Nb-CEEE-PBAE (Nb-SEQ ID NO:10-PBAE) polymer (core40HEGt/C6E3) at 1 µM concentration, alone or in presence of the costimulatory monoclonal anti-CD28 antibody (CD28 mAb) at 7 nM concentration. Each condition represents mean values obtained on PBMCs from two different blood donors. For comparison, viability of PBMCs cultured alone or in presence of anti-CD3 (CD3 mAb) and anti-CD28 monoclonal antibodies (at concentrations of 7 nM each) are shown.

As shown in FIG. 7, viability was similar for all tested conditions when human PBMCs from two different donors were cultured for up to 72 h. Profiles were comparable when the aptamer was present in excess concentrations (1 µM) in its free form or conjugated to the CEEE polymer. Addition of the anti-CD28 costimulatory antibody, which is known to induce the activation and proliferation of T lymphocytes in combination with CD3 binding agents, did not have any impact of the viability. Therefore, these results suggest that the functionalization of CEEE polymer with norbornene and the IEDDA click chemistry reaction used to covalently conjugate the CD3 targeting agent do not generate any cytotoxic product that could alter the viability of human cells.

Activation of T Lymphocytes by Anti-CD3 Targeting Agents Coupled to OM-PBAEs by IEDDA Click Chemistry Human PBMCs were isolated from buffy coats obtained from two healthy donors as previously described. Human PBMCs were seeded in 96-well plates at a density of $2×10^5$ cells per well in RPMI medium containing 10% FBS and 1% penicillin/streptomycin. Cells were then incubated for up to 72 h in presence of anti-CD3 and anti-CD28 monoclonal antibodies (Gibco Invitrogen) at concentrations of 1 µg/mL (7 nM each) as positive control, 1 µM of anti-CD3 core40HEG alone or 1 µg/mL of anti-CD28 monoclonal antibody (7 nM) or 1 µM of anti-CD3 aptamer/PBAE alone or 1 µg/mL of anti-CD28 monoclonal antibody (7 nM). Fresh monomeric or polymer-conjugated aptamer solutions were added to cells after 24 and 48 h incubation in order to keep aptamer concentrations constant and compensate for degradation in serum. Alternatively, cells were cultured in RPMI medium without reagents (negative control).

After 0, 24, 48 and 72 h culture, samples were centrifuged at 320 g for 5 minutes, and the supernatant was recovered and stored at −80° C. until analysis with Mouse Th1/Th2 Cytometric Bead Array (CBA) (Becton Dickinson Biosciences) following the manufacturer's instructions. Samples were analyzed by flow cytometry (AttuneNXT; Invitrogen, Inc.) on the YL-1 channel and plasma levels of secreted Interleukin 2 (IL-2), Interleukin 4 (IL-4), Interleukin 5 (IL-5), Tumor Necrosis Factor alpha (TNF-α) and Interferon gamma (IFN-g) were quantified with the AttuneNXT software (Invitrogen, Inc.). The results obtained are shown in FIGS. 9A-9E.

Figure 8A:
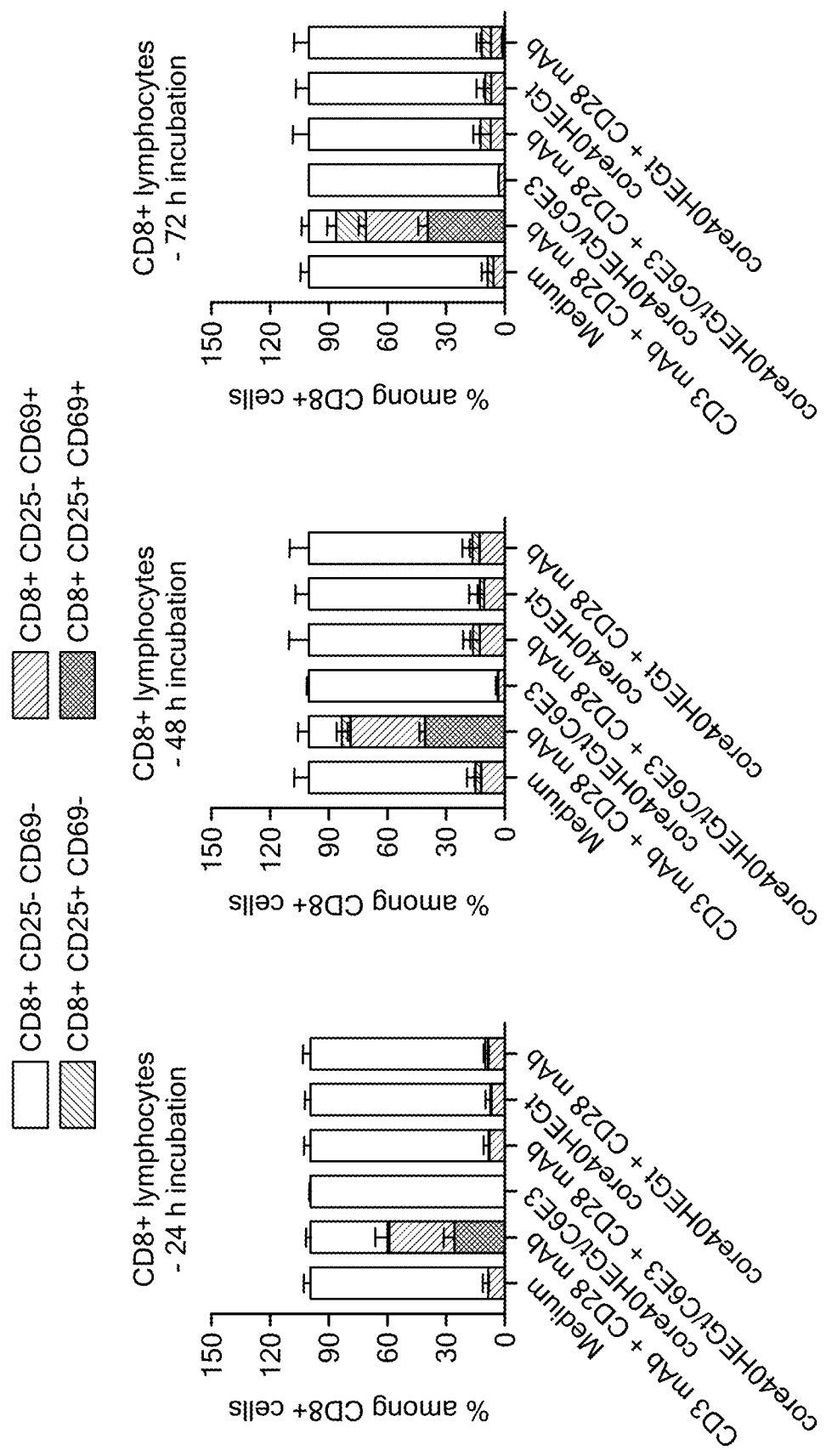
FIGS. 8A and 8B are bar graphs showing the activation of human lymphocytes as measured by expression of CD25 and CD69 activation markers after 0, 24, 48 and 72 h incubation in presence of an anti-CD3 aptamer (core40HEGt), the same anti-CD3 aptamer covalently grafted to Nb-CEEE-PBAE (Nb-SEQ ID NO:10-PBAE) polymer (core40HEGt/C6E3) at 1 µM concentration, alone or in presence of the costimulatory monoclonal anti-CD28 antibody (CD28 mAb) at 7 nM concentration. After 24 h and 48 h incubation, fresh solutions mixed with anti-CD28 antibody were added to culture medium in order to keep the concentration of aptamers constant.
Figure 8B:
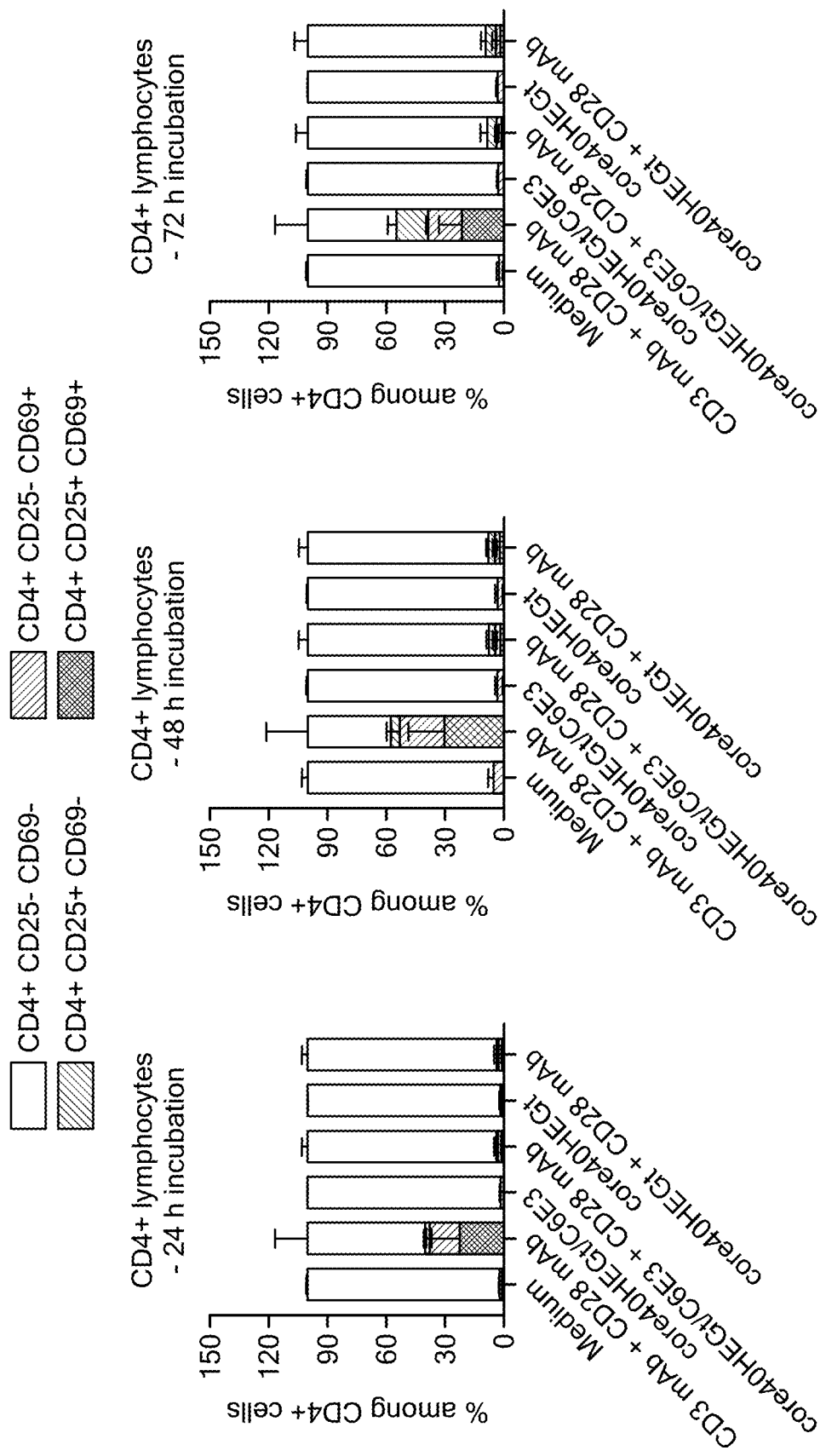
Figure 9A:
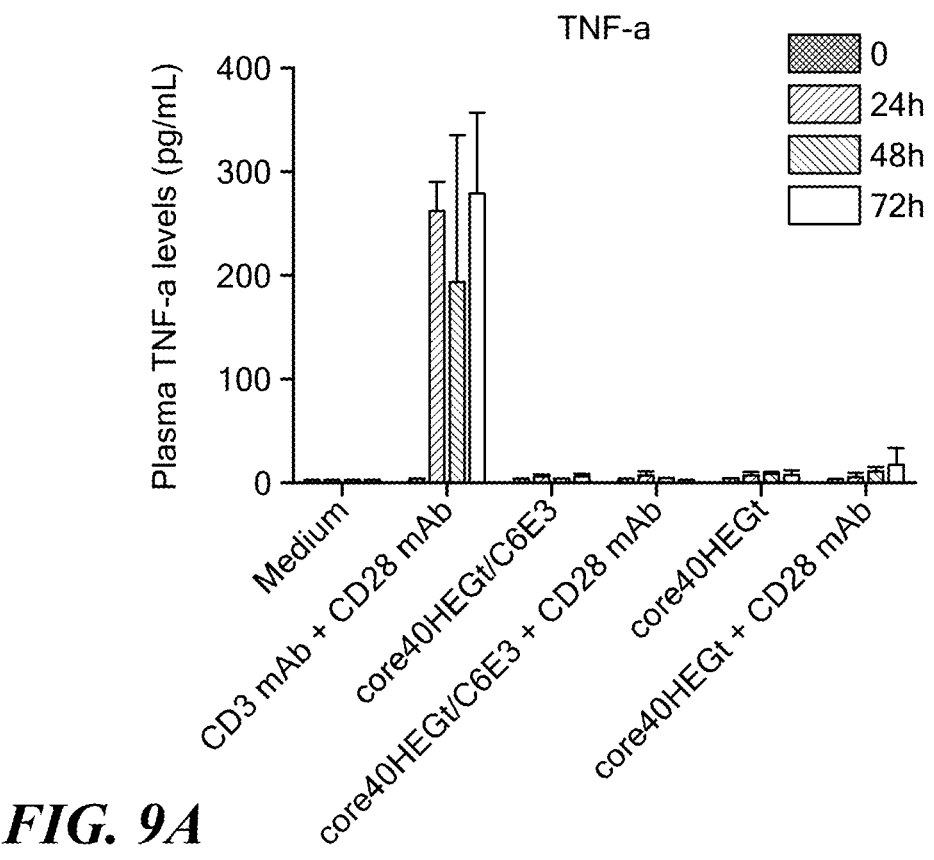
FIGS. 9A-9E are bar graphs showing activation of human lymphocytes as measured by secretion of cytokines after 0, 24, 48 and 72 h incubation in presence of an anti-CD3 aptamer (core40HEGt), the same anti-CD3 aptamer covalently grafted to Nb-CEEE-PBAE (Nb-SEQ ID NO:10-PBAE) polymer (core40HEGt/C6E3) at 1 µM concentration, alone or in presence of the costimulatory monoclonal anti-CD28 antibody (CD28 mAb) at 7 nM concentration. After 24 h and 48 h incubation, fresh solutions mixed with anti-CD28 antibody were added to culture medium in order to keep the concentration of aptamers constant. TNF-a (FIG. 9A), IFN-g (FIG. 9B), IL-5 (FIG. 9C), IL4(FIG. 9D) and IL-2 (FIG. 9E) were quantified by bead-based flow cytometry method on culture supernatants. Each condition represents mean values obtained on PBMCs from two different blood donors. For comparison, activation of PBMCs cultured alone or in presence of anti-CD3 (CD3 mAb) and anti-CD28 monoclonal antibodies (at concentrations of 7 nM each) are shown.
Figure 9B:
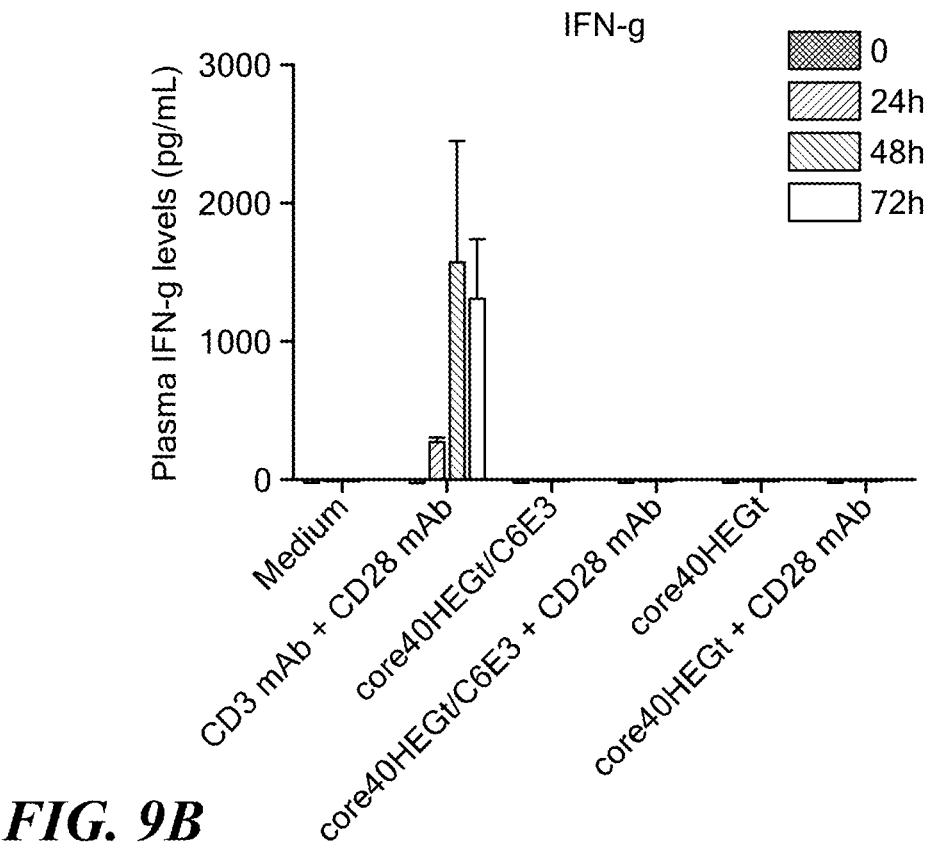
Figure 9C:
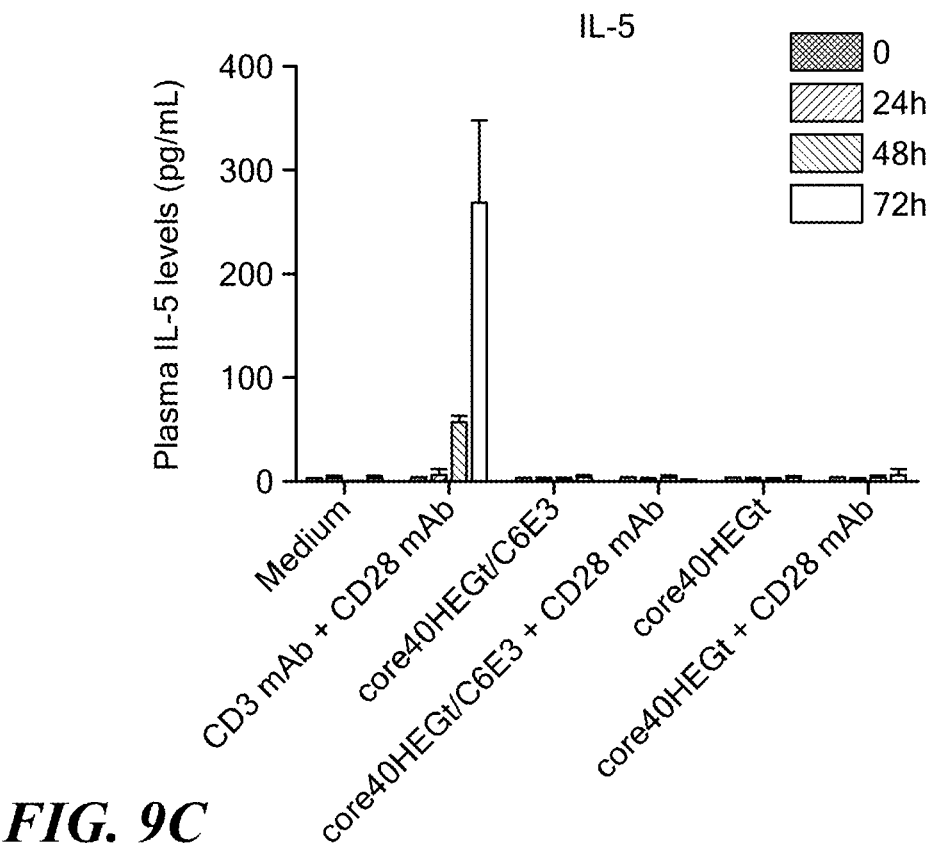
Figure 9D:
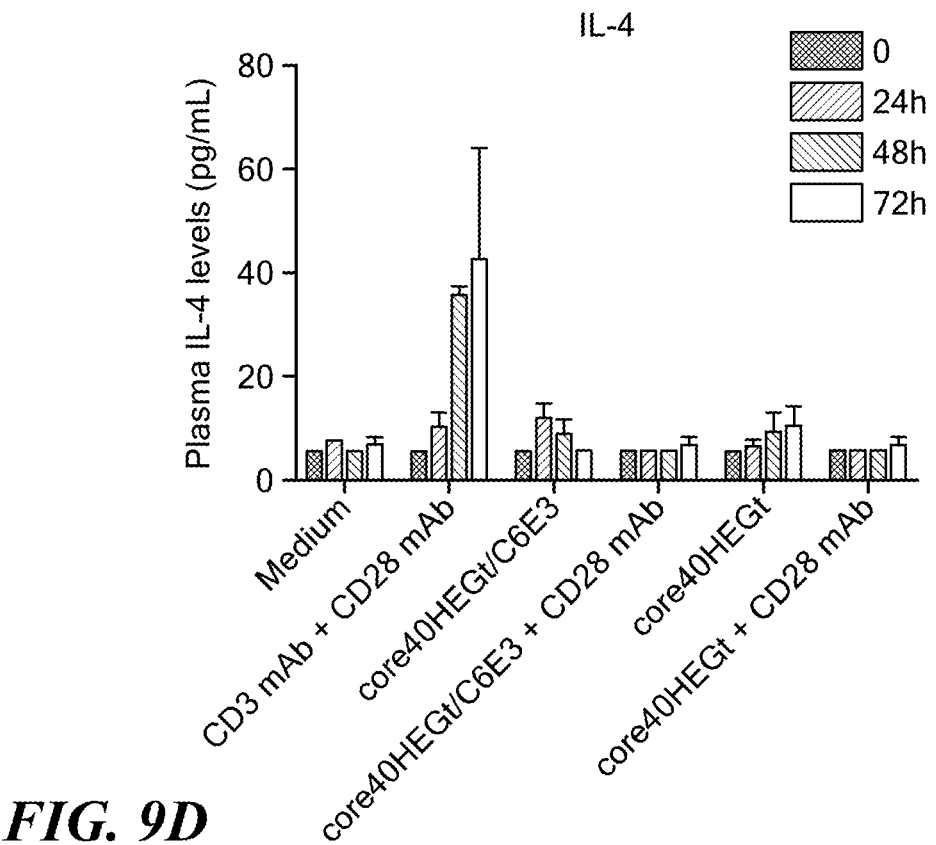
Figure 9E:
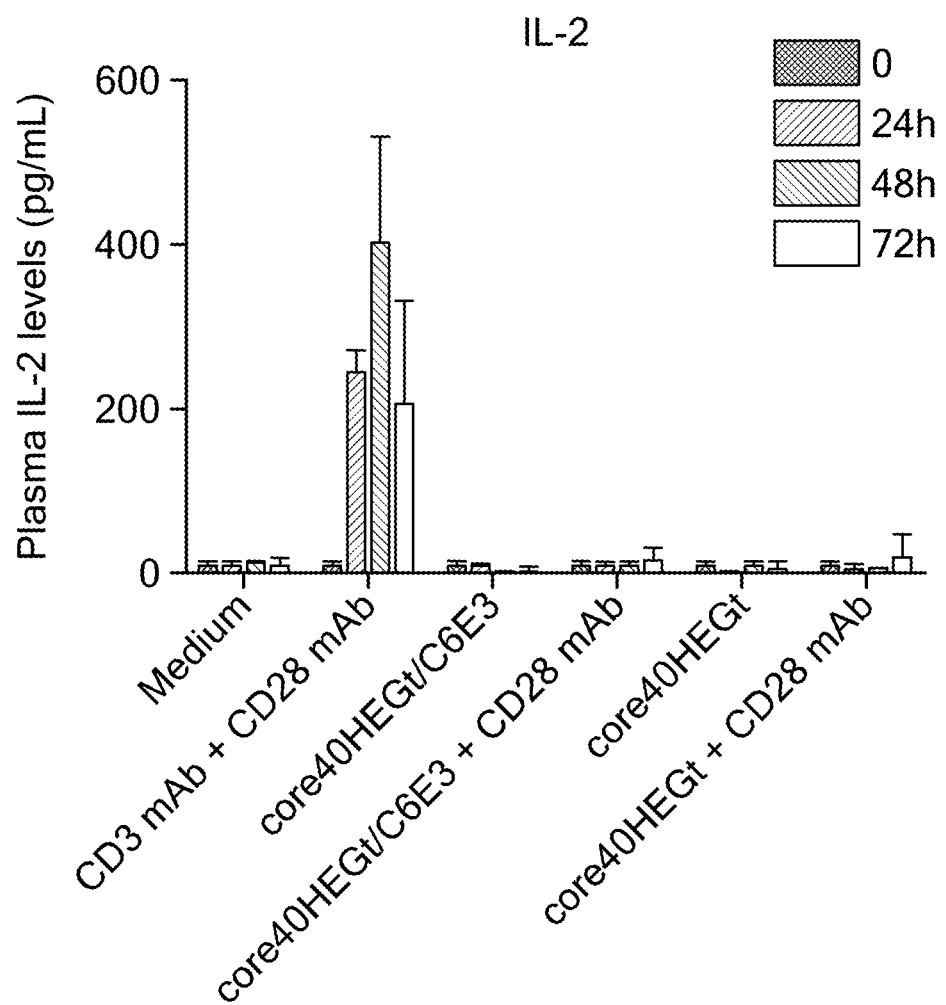

After collection of culture supernatants, cells were harvested and phenotypes of T lymphocytes and expression of activation markers were analyzed after staining of cells with specific antibody panels purchased from Biolegend according to manufacturer's instructions: general panel (CD45-BV510, CD3e-AF700, CD4-PerCP-Cy5.5, CD8a-BV605) and activated T-cells (CD69-PE-Dazzle and CD25-PE). Fluorescence-positive cells were counted by flow cytometry (AttuneNXT; Invitrogen, Inc.) on BL3 (PerCP-Cy5.5 dye), YL1 (PE dye), YL2 (PE-Dazzle dye), RL2 (AF700 dye), VL2 (BV510 dye) and VL3 (BV-605 dye) channels. Cell phenotypes were defined among CD45$^+$, viable and single cells as follows: T lymphocytes (CD3e$^{high}$), CD4+T lymphocytes (CD4$^{high}$) and CD8+T lymphocytes (CD8$^{high}$) whereas activated T-cells were identified as 3 subpopulations (CD25$^{high}$-CD69$^{low}$; CD25$^{low}$-CD69$^{high}$ or CD25$^{high}$-CD69$^{high}$). The results obtained are shown in FIGS. 8A-8B.

Cells treated with anti-CD3 monoclonal and anti-CD28 monoclonal antibodies exhibited an increased and time-dependent secretion all measured cytokines and upregulation of surface expression of CD25 and CD69 activation markers. The anti-CD3 aptamer in its monomeric form or grafted on the polymer by IEDDA click chemistry did not activate the cytokine secretion of surface marker expression even when combined with costimulatory anti-CD28 antibody. Keeping aptamer concentrations constant by adding fresh solutions in a repeated manner to compensate for degradation in serum did not result in a more sustained activation profile. Therefore, covalent coupling of a CD3 binder by IEDDA click chemistry to norbornene-modified CEEE polymer and its resulting multimerization do not influence its lack of activity on human T lymphocytes.

Valuation of Receptor Internalization in T Lymphocytes by Anti-CD3 Targeting Agents Coupled to OM-PBAEs by IEDDA Click Chemistry Human PBMCs were isolated from buffy coats obtained from two healthy donors as previously described. Human PBMCs were seeded in 96-well plates at a density of 2×10$^5$ cells per well in RPMI medium containing 10% FBS and 1% penicillin/streptomycin. Cells were then incubated for up to 72 h in presence of anti-CD3 OKT-3 antibody together with the costimulatory and anti-CD28 monoclonal antibody (Gibco Invitrogen) at concentrations of 1 µg/mL (7 nM each) as positive control, 1 µM of anti-CD3 core40HEG alone or 1 µg/mL of anti-CD28 monoclonal antibody (7 nM) or 1 µM of anti-CD3 aptamer/PBAE alone or 1 µg/mL of anti-CD28 monoclonal antibody (7 nM). Fresh monomeric or polymer-conjugated aptamer solutions were added to cells after 24 and 48 h incubation in order to keep aptamer concentrations constant and compensate for degradation in serum. Alternatively, cells were cultured in RPMI medium without reagents (negative control).

Figure 10A:
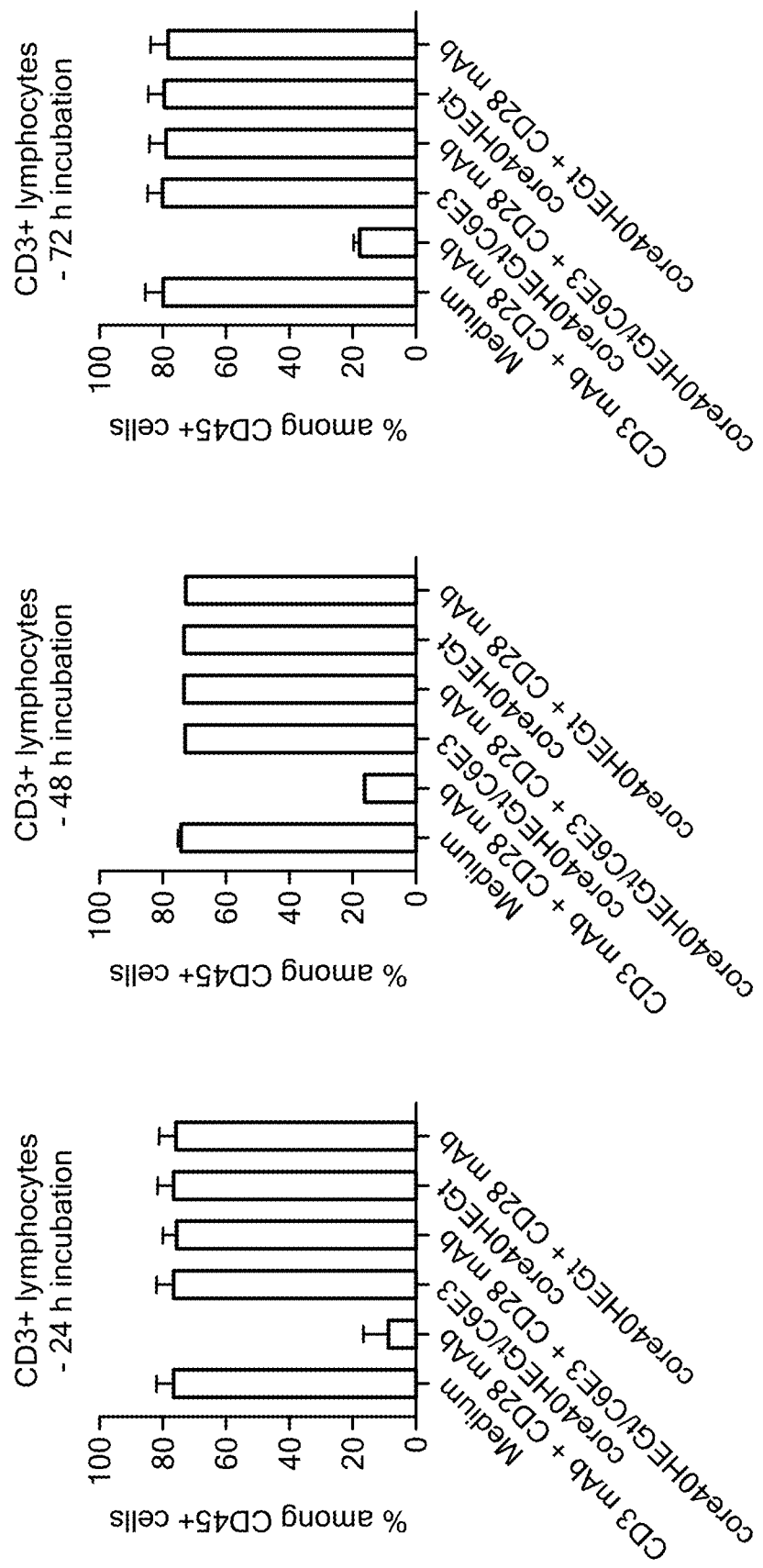
FIGS. 10A and 10B are bar graphs showing CD3 receptor internalization of human lymphocytes measured by flow cytometry after 0, 24, 48 and 72 h incubation in presence of an anti-CD3 aptamer (core40HEGt), the same anti-CD3 aptamer covalently grafted to Nb-CEEE-PBAE (Nb-SEQ ID NO:10-PBAE) polymer (core40HEGt/C6E3) at 1 µM concentration, alone or in presence of the costimulatory monoclonal anti-CD28 antibody (CD28 mAb) at 7 nM concentration. After 24 h and 48 h incubation, fresh solutions mixed with anti-CD28 antibody were added to culture medium in order to keep the concentration of aptamers constant.
Figure 10B:
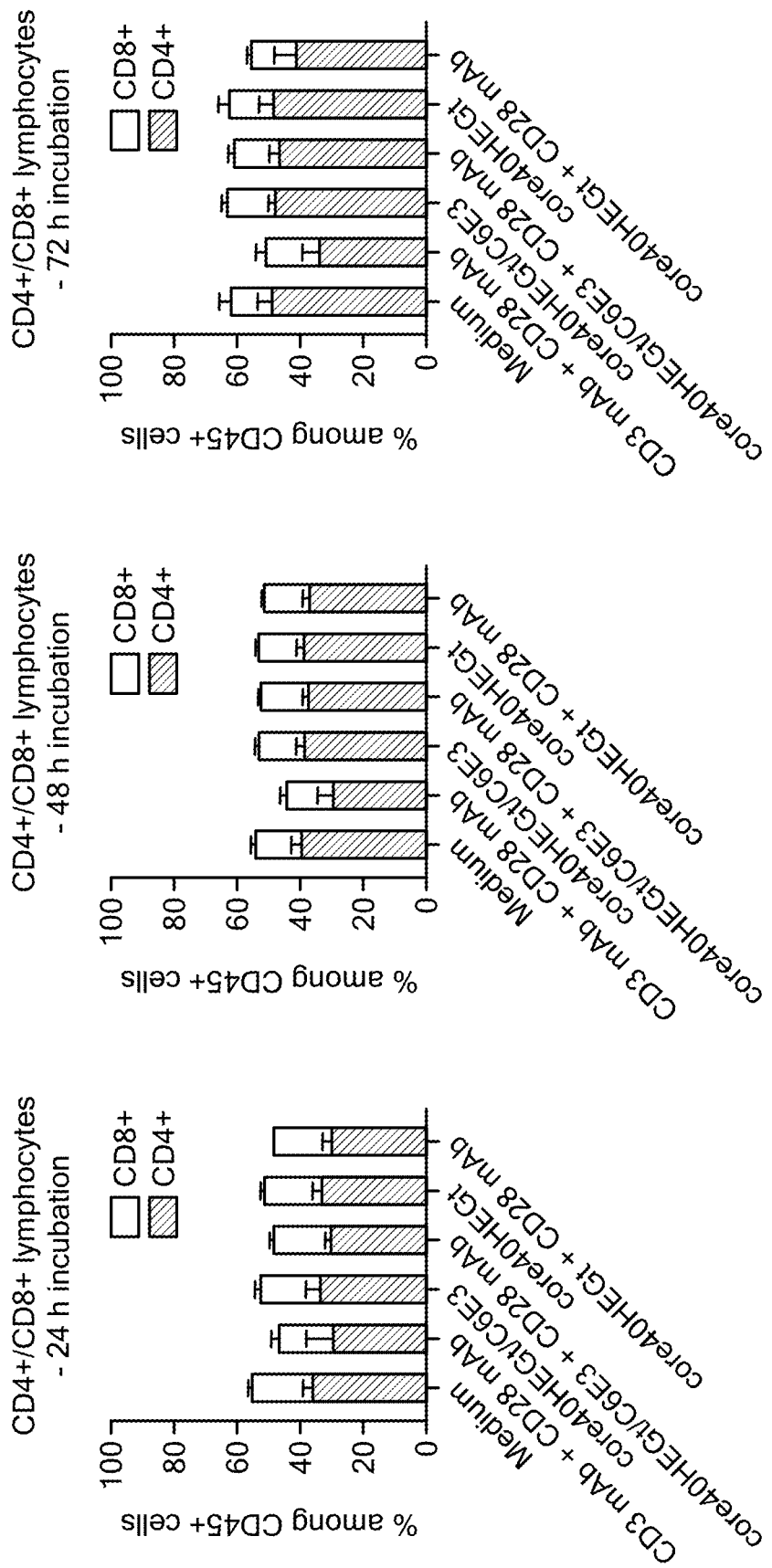

After 0, 24, 48 and 72 h culture, cells were harvested and stained with specific antibodies directed against CD3, CD4 and CD8 surface markers purchased from Biolegend according to manufacturer's instructions. For CD3 receptor, antibody clone SK7 was used as it does not bind to the same epitope as the one recognized by OKT3. CD45-BV510, CD3e-AF700, CD4-PerCP-Cy5.5 and CD8a-BV605 reagents were used and fluorescence-positive cells were counted by flow cytometry (AttuneNXT; Invitrogen, Inc.) on BL3 (PerCP-Cy5.5 dye), RL2 (AF700 dye), VL2 (BV510 dye) and VL3 (BV-605 dye) channels. Cell phenotypes were defined among CD45$^+$, viable and single cells as follows: T lymphocytes (CD3e$^{high}$), CD4$^+$ T lymphocytes (CD4$^{high}$) and CD8$^+$ T lymphocytes (CD8$^{high}$). The results obtained are shown in FIGS. 10A-10B.

Cells treated with anti-CD3 monoclonal and anti-CD28 monoclonal antibodies exhibited a significant reduction (superior to 80%) in the number of CD3-positive lymphocytes whereas expression levels of other CD4- and CD8-specific receptors were not changed. This differential expression profile already observed after 24 h incubation reflects the ability of the OKT-3 antibody to internalize the CD3 receptor upon binding to its recognized epitope, a property responsible for the immunosuppressant activity of this therapeutic antibody. The anti-CD3 aptamer in its monomeric form or grafted on the polymer by IEDDA click chemistry did not induce such a CD3 internalization even when combined with costimulatory anti-CD28 antibody. Keeping aptamers concentrations constant by adding fresh solutions in a repeated manner to compensate for degradation in serum did not result in a more sustained activation profile. This last functional assay confirms that covalent coupling of a CD3 binder by IEDDA click chemistry to norbornene-modified CEEE polymer and its resulting multimerization do not influence its lack of activity on human T lymphocytes.

Altogether, norbornene-modified OM-PBAE polymers were functionalized via IEDDA click chemistry with biologically active moieties without altering their properties or inducing cell toxicity.

As used herein, the term "about" refers to a range of within plus or minus 10%, 5%, 1%, or 0.5% of the stated value.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with the alternative expression "consisting of" or "consisting essentially of".

The content of the ASCII text file of the sequence listing named "Substitute-Sequence-Listing-12269-0903", having a size of 10.8 kb and a creation date of 5 Sep. 2023, and electronically submitted via EFS on 5 Sep. 2023, is incorporated herein by reference in its entirety.

REFERENCES

Fornaguera C, Guerra-Rebollo M, Lezaro M A, Cascante A, Rubio N et al. In Vivo Retargeting of Poly(beta aminoester) (OM-PBAE) Nanoparticles is Influenced by Protein Corona. Adv. Healthc. Mater. 2019, 1900849.

Jones C H, Chen M, Ravikrishnan A, Reddinger R, Zhang G et al. Mannosylated poly(beta-amino esters) for targeted antigen presenting cell immune modulation. Biomaterials 2015, 37: 333-44.

Green J J, Chiu E, Leshchiner E S, Shi J, Langer R et al. Electrostatic Ligand Coatings of Nanoparticles Enable Ligand-Specific Gene Delivery to Human Primary Cells. Nano Letters 2007, 7: 874-9.

Kolb H C, Finn M G, Sharpless K B. Click chemistry: diverse chemical function from a few good reactions. Angew. Chem. Int. Ed. Engl. 2001, 40: 2004-21.

Lv H, Zhang S, Wang B, Cui S, Yan J. Toxicity of cationic lipids and cationic polymers in gene delivery. J Control Release. 2006, 114:100-9.

Meyer C, Liebscher S, Bordusa F. Selective Coupling of Click Anchors to Proteins via Trypsiligase. Bioconjugate Chem. 2016, 27: 47-53.

Schoch J, Ameta S, Jäschke A. Inverse electron-demand Diels-Alder reactions for the selective and efficient labeling of RNA. Chem. Commun., 2011, 47:12536-12537.

Smith T T, Stephan S B, Moffett H F, McKnight L E, Ji W et al. In situ programming of leukaemia-specific T cells using synthetic DNA nanocarriers. Nat. Biotechnol. 2017, 12: 813-20.

Zhang F, Parayath N N, Ene Cl, Stephan S B, Koehne A L et al. Genetic programming of macrophages to perform anti-tumor functions using targeted mRNA nanocarriers. Nat. Commun. 2019, 10:3974.

Zhang J, Chen R, Fang X, Chen F, Wang Y et al. Nucleolin targeting AS1411 aptamer modified pH-sensitive micelles for enhanced delivery and antitumor efficacy of paclitaxel. Nano Research 2015, 8: 201-1

The invention claimed is:

1. A method of synthesizing a targeted poly(beta-amino ester) (PBAE) compound, the method comprising coupling a tetrazine functionalized targeting moiety to a strained alkene ring functionalized PBAE using inverse electron demand Diels-Alder (IEDDA) click chemistry.

2. The method of claim 1, wherein the strained alkene ring is selected from the group consisting of norbornene, a carbon containing ring including a strained alkene, a carbon containing ring including a bridged bond and a strained alkene, cyclopropene, cyclobutene, and trans-cyclooctene.

3. The method of claim 2, wherein the strained alkene ring is norbornene.

4. The method of claim 1, wherein the tetrazine functionalized targeting moiety comprises 1,2,4,5-tetrazine.

5. The method of claim 4, wherein the tetrazine functionalized targeting moiety comprises a structure according to Formula 10

(Formula 10)

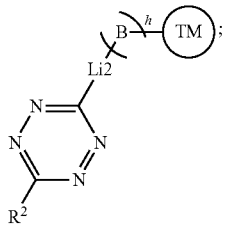

tetrazine functionalized targeting moiety (TFM)

wherein Li2 is a bond, —(CH₂)—, —O—, —O—(C=O)—, —(C=O)—O—,

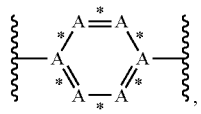

or a combination thereof; wherein each atom at A is independently selected from C, N, O, S, and B and each bond at * is independently a single bond, a resonant and/or semi-resonant aromatic bond, or a double bond; wherein B is a bond, —(CH2)-, —O—, —O—(C=O)—, —(C=O)—O—, —S—, —S—(C=O)—, —SO2CH2-, —(C=O)—S—, —N—, —N—(C=O)—, —(C=O)—N—, or a combination thereof; wherein R³ is hydrogen or a substituent; wherein h is not less than 3; and wherein TM is a targeting moiety.

6. The method of claim 5, wherein R³ is —H, —OCH3, (C=O)—O—CH3, (C=O)—CH3(Acetyl, Ac), —(C=O)—O-tert-butyl (BOC), —NHAc, —NHBOC,

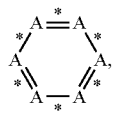

or a combination thereof, and wherein each atom at A is independently selected from C, N, O, S, and B, and each bond at * is independently a single bond, a resonant aromatic bond, or a double bond.

7. The method of claim 5, wherein Li2 comprises

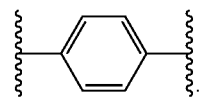 [SMILES: *c1ccc(*)cc1]

8. The method of claim 5, wherein the tetrazine functionalized targeting moiety comprises a structure according to Formula 11

(Formula 11)

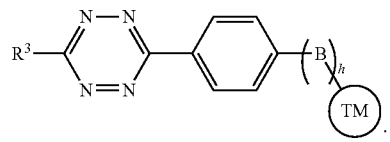

9. The method of claim 1, wherein the targeting moiety comprises an aptamer, a multispecific aptamer, an antibody, an antibody fragment, a scFv antibody, an antibody-like protein scaffold, an oligopeptide, a spiegelmer, a ligand for a cell surface receptor, or a combination thereof.

10. The method of claim 1, wherein the coupling is performed in an aqueous solution, optionally at a temperature in the range from about 15° C. to about 30° C.

11. The method of claim 1, wherein greater than about 70%, 80%, 90%, 95%, or 99% (mol %) of the tetrazine functionalized targeting moiety is coupled to the strained alkene ring functionalized PBAE in less than about 15 minutes.

12. The method of claim 1, further comprising synthesizing the functionalized PBAE by a method comprising the steps of:
polymerizing amine and diacrylate monomers to yield a PBAE-diacrylate precursor; and
grafting a strained alkene ring comprising norbornene carboxylic acid onto an —OH side chain of the PBAE-diacrylate backbone via DCC coupling to obtain a norbornene-functionalized PBAE.

13. The method of claim 1, further comprising:
modifying the norbornene functionalized PBAE using a cysteine-containing oligopeptide using a thiol-Michael addition reaction.

14. The method of claim 13, wherein the oligopeptide is selected from the group consisting of Cys-Arg-Arg-Arg (SEQ ID NO:4), Cys-Lys-Lys-Lys (SEQ ID NO:7), Cys-His-His-His (SEQ ID NO:1), Cys-Glu-Glu-Glu (SEQ ID NO:10), and Cys-Asp-Asp-Asp (SEQ ID NO:13).

15. The method of claim 1, wherein the click chemistry reaction is performed by reacting said tetrazine functionalized targeting moiety with a nanoparticle comprising a norbornene functionalized PBAE on a surface of the nanoparticle.

16. A targeted PBAE obtainable by the method of claim 1.

17. A targeted nanoparticle comprising the targeted PBAE of claim 16.

18. The targeted nanoparticle of claim 17, wherein the targeting moiety of the targeted PBAE is an aptamer, an antibody, an antibody fragment, a scFv, an antibody-like protein scaffold, an oligopeptide, a spiegelmer, or a ligand for a cell surface receptor that binds an antigen specific for a tumor cell or an immune cell.

19. The targeted nanoparticle of claim 18, wherein the aptamer is an anti-CD3 aptamer.

20. A kit for synthesizing a targeted poly(beta-amino ester) (PBAE) compound, the kit comprising:
a norbornene functionalized PBAE; and
instructions for carrying out the method of claim 1.

21. The kit of claim 20, further comprising:
a tetrazine functionalized targeting moiety.

22. The kit of claim 20, wherein the norbornene functionalized PBAE is present in a nanoparticle.

23. A targeted poly(beta-amino ester) (PBAE) comprising:

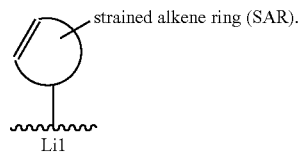

24. The PBAE of claim 23, wherein the strained alkene ring (SAR) comprises norbornene, a carbon containing ring including a strained alkene, a carbon containing ring including a bridged bond and a strained alkene, cyclopropene, cyclobutene, or trans-cyclooctene.

25. The PBAE of claim 23, wherein $R^1$ and/or $R^2$ are attached to the polymer chain through a covalent bond comprising a thioether —S—.

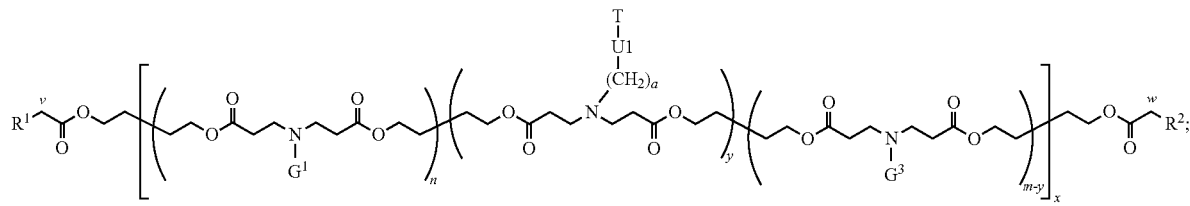

(Formula 9)

wherein $G^1$ and $G^3$ are independently selected at each occurrence from the group consisting of —H, H3C—(CH2)(2-9)-, and HO—(CH2)(3-10)-;

$R^1$ and $R^2$ are independently selected from the group consisting of CH2 with C=C double bond to atom v or to atom w;

(Formula 5)

H2N polymer chain;

(Formula 6)

H2N polymer chain;

SEQ ID NO:4; SEQ ID NO:7; SEQ ID NO:1; SEQ ID NO:10; and SEQ ID NO:13;

Ra is independently selected at each occurrence from the group consisting of H2NC(=NH)—NH(CH2)3-, H2N(CH2)4—, and (1H-imidazol-4-yl)-CH2-; Li1 is independently selected at each occurrence from the group consisting of a bond, —O—, —O—(C=O)—, —(C=O)—O—, and —(CH2)-;

a is an integer in the range from 3-10; p is an integer in the range from 1-3; n is an integer in the range from 1-500; y is an integer in the range from 1-500; m is an integer in the range from 1-500 and m>y; x is an integer in the range from 5-10000; and in one or more occurrence, each of the one or more T independently comprises a strained alkene ring (SAR):

26. The targeted PBAE of claim 23, further comprising a tetrazine functionalized targeting moiety (TFM) including a targeting moiety (TM).

27. The PBAE of claim 26, wherein the tetrazine functionalized targeting moiety (TFM) comprises:

(Formula 10)

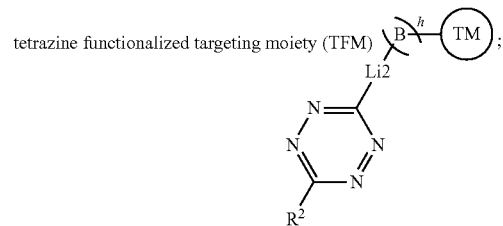

wherein Li2 comprises a bond, —(CH$_2$)—, —O—, —O—(C=O)—, —(C=O)—O—,

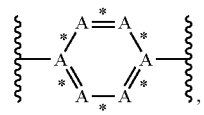

or a combination thereof; wherein each atom at A is independently selected from C, N, O, S, and B and each bond at * is independently a single bond, a resonant and/or semi-resonant aromatic bond, or a double bond;

B comprises a bond, —(CH2)-, —O—, —O—(C=O)—, —(C=O)—O—, —S—, —S—(C=O)—, —SO2CH2-, —(C=O)—S—, —N—, —N—(C=O)—, —(C=O)—N—, or a combination thereof;

$R^3$ is hydrogen or a substituent;
h is not less than 3; and
TM is a targeting moiety.

28. The PBAE of claim 27, wherein $R^3$ comprises —H, —OCH3, (C=O)—O—CH3, —(C=O)—CH3(Acetyl, Ac), —(C=O)—O-tert-butyl (BOC), —NHAc, —NHBOC,

or a combination thereof, and with each atom at A independently selected from C, N, O, S, and B and each bond at * is independently a single bond, a resonant aromatic bond, or a double bond.

29. The PBAE of claim 27, wherein Li2 comprises

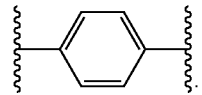

30. The PBAE of claim 26, wherein the tetrazine functionalized targeting (TFM) moiety comprises:

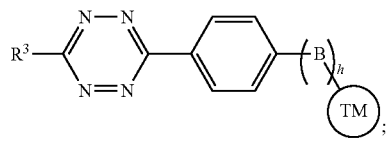

(Formula 11)

wherein $R^3$ is H or a substituent; B comprises a bond, —(CH2)-, —O—, —O—(C=O)—, —(C=O)—O—, —S—, —S—(C=O)—, —SO2CH2-, —(C=O)—S—, —N—, —N—(C=O)—, —(C=O)—N—, or a combination thereof; h is not less than 3; and TM is a targeting moiety.

31. The PBAE of claim 30, wherein $R^3$ comprises —H, —OCH3, (C=O)—O—CH3, —(C=O)—CH3(Acetyl, Ac), —(C=O)—O-tert-butyl (BOC), —NHAc, —NHBOC,

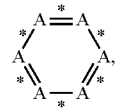

or a combination thereof, and with each atom at A independently selected from C, N, O, S, and B and each bond at * is independently a single bond, a resonant aromatic bond, or a double bond.

32. A targeted PBAE comprising:

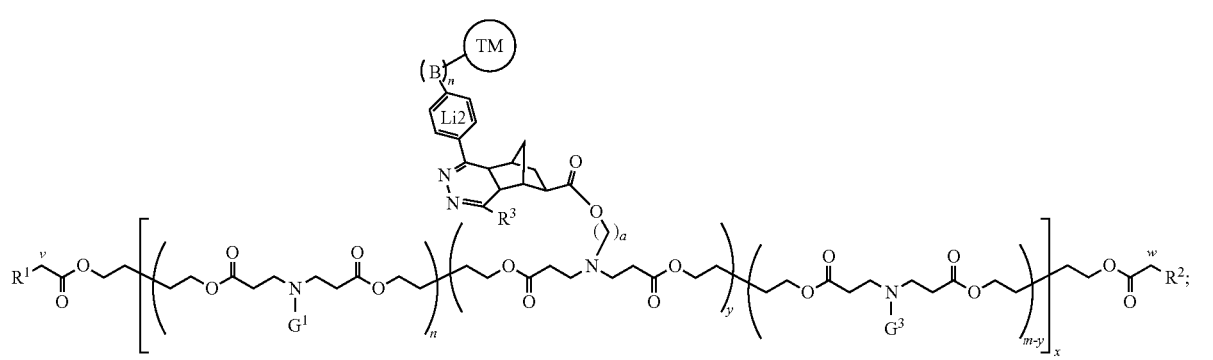

(Formula 12)

wherein G¹ and G³ are independently selected at each occurrence from the group consisting of —H, H3C—(CH2)(2-9)-, and HO—(CH2)(3-10)-;

R¹ and R² are independently selected from the group consisting of CH2 with C=C double bond to atom v or to atom w;

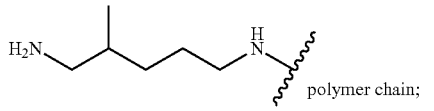
(Formula 5)

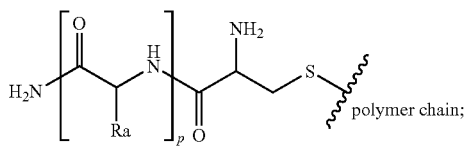
(Formula 6)

SEQ ID NO:4; SEQ ID NO:7; SEQ ID NO:1; SEQ ID NO:10; and SEQ ID NO:13;

Ra is independently selected at each occurrence from the group consisting of H2NC(=NH)—NH(CH2)3-, H2N(CH2)4-, and (1H-imidazol-4-yl)-CH2-; Li1 is independently selected at each occurrence from the group consisting of a bond, —O—, —O—(C=O)—, —(C=O)—O—, and —(CH2)-;

a is an integer in the range from 3-10; p is an integer in the range from 1-3; n is an integer in the range from 1-500; y is an integer in the range from 1-500; m is an integer in the range from 1-500 and m>y; x is an integer in the range from 5-10000; and TM is a targeting moiety comprising an aptamer, a multi-specific aptamer, an antibody, an antibody fragment, a scFv, an antibody-like protein scaffold, an oligopeptide, a spiegelmer, a ligand for cell surface receptors, SEQ ID NO 6, or a combination thereof.

* * * * *